US008583650B2

(12) United States Patent
Fellenstein et al.

(10) Patent No.: US 8,583,650 B2
(45) Date of Patent: *Nov. 12, 2013

(54) AUTOMATED MANAGEMENT OF SOFTWARE IMAGES FOR EFFICIENT RESOURCE NODE BUILDING WITHIN A GRID ENVIRONMENT

(75) Inventors: Craig William Fellenstein, Brookfield, CT (US); Rick Allen Hamilton, II, Charlottesville, VA (US); Joshy Joseph, Poughkeepsie, NY (US); James W Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 469 days.

This patent is subject to a terminal disclaimer.

(21) Appl. No.: 12/535,404

(22) Filed: Aug. 4, 2009

(65) Prior Publication Data

US 2009/0313229 A1 Dec. 17, 2009

Related U.S. Application Data

(63) Continuation of application No. 11/031,543, filed on Jan. 6, 2005, now Pat. No. 7,590,623.

(51) Int. Cl.
*G06F 17/30* (2006.01)
(52) U.S. Cl.
USPC ........................................................ 707/740
(58) Field of Classification Search
None
See application file for complete search history.

(56) References Cited

U.S. PATENT DOCUMENTS

| 4,096,561 | A | 6/1978 | Trinchieri |
| 4,591,980 | A | 5/1986 | Huberman et al. |
| 5,220,674 | A | 6/1993 | Morgan |
| 5,325,525 | A | 6/1994 | Shan et al. |
| 5,392,430 | A | 2/1995 | Chen et al. |
| 5,416,840 | A | 5/1995 | Cane et al. |

(Continued)

FOREIGN PATENT DOCUMENTS

| CN | 1336054 | 2/2002 |
| EP | 0790559 | 8/1997 |

(Continued)

OTHER PUBLICATIONS

Ding, Jingbo; Weiqin Tong, "An agent Model for Managing Distributed Software Resources in Grid Environment", 2003, Springer, pp. 971-980.*

(Continued)

*Primary Examiner* — Dinku Gebresenbet
(74) *Attorney, Agent, or Firm* — Mark C. Vallone; Amy J. Pattillo

(57) ABSTRACT

A grid service detects a current software environment for a grid job within a grid environment, wherein the grid environment includes multiple grid resources. The grid service searches a catalog of multiple software images to determine whether an image for the current software environment matches any software images in the catalog. Each of the software images includes an index into at least one installation image. Storage of the software images is structured in the catalog for automated efficient access to each software image by multiple resource nodes within the grid environment. If the grid service does not locate a software image for the current software environment in the catalog, the grid service captures at least one installation image for the current software environment for storage in the catalog as an additional software image.

20 Claims, 8 Drawing Sheets

(56) References Cited

U.S. PATENT DOCUMENTS

| | | |
|---|---|---|
| 5,537,542 A | 7/1996 | Eilert et al. |
| 5,559,978 A | 9/1996 | Spilo |
| 5,630,156 A | 5/1997 | Privat et al. |
| 5,640,569 A | 6/1997 | Miller et al. |
| 5,655,081 A | 8/1997 | Bonnell |
| 5,729,472 A | 3/1998 | Seiffert |
| 5,799,173 A | 8/1998 | Gossler et al. |
| 5,881,238 A | 3/1999 | Aman et al. |
| 5,884,046 A | 3/1999 | Antonov |
| 5,905,975 A | 5/1999 | Ausubel |
| 5,931,911 A | 8/1999 | Remy et al. |
| 5,960,176 A | 9/1999 | Kuroki et al. |
| 5,978,583 A | 11/1999 | Ekanadham |
| 5,996,013 A | 11/1999 | Delp et al. |
| 6,003,075 A | 12/1999 | Arendt et al. |
| 6,021,398 A | 2/2000 | Ausubel |
| 6,023,612 A | 2/2000 | Harris et al. |
| 6,038,560 A | 3/2000 | Wical |
| 6,049,828 A | 4/2000 | Dev et al. |
| 6,064,810 A | 5/2000 | Raad et al. |
| 6,067,580 A | 5/2000 | Aman et al. |
| 6,119,186 A | 9/2000 | Watts et al. |
| 6,134,680 A | 10/2000 | Yeomans |
| 6,154,787 A | 11/2000 | Urevig et al. |
| 6,167,445 A | 12/2000 | Gai |
| 6,182,139 B1 | 1/2001 | Brendel |
| 6,304,892 B1 | 10/2001 | Bhoj et al. |
| 6,310,889 B1 | 10/2001 | Parsons et al. |
| 6,324,656 B1 | 11/2001 | Gleichauf et al. |
| 6,356,909 B1 | 3/2002 | Spencer |
| 6,370,565 B1 | 4/2002 | Van Gong |
| 6,397,197 B1 | 5/2002 | Gindlesperger |
| 6,421,737 B1 | 7/2002 | Stone et al. |
| 6,430,711 B1 | 8/2002 | Sekizawa |
| 6,438,704 B1 | 8/2002 | Harris et al. |
| 6,452,692 B1 | 9/2002 | Yacoub |
| 6,453,376 B1 | 9/2002 | Fairman et al. |
| 6,463,454 B1 | 10/2002 | Lumelsky |
| 6,463,457 B1 | 10/2002 | Armentrout |
| 6,466,947 B2 | 10/2002 | Arnold et al. |
| 6,470,384 B1 | 10/2002 | O'Brien et al. |
| 6,480,955 B1 | 11/2002 | DeKoning et al. |
| 6,516,312 B1 | 2/2003 | Kraft et al. |
| 6,552,813 B2 | 4/2003 | Yacoub |
| 6,560,609 B1 | 5/2003 | Frey |
| 6,564,377 B1 | 5/2003 | Jayasimha |
| 6,567,935 B1 | 5/2003 | Figeuroa |
| 6,578,160 B1 | 6/2003 | MacHardy, Jr. et al. |
| 6,591,262 B1 | 7/2003 | MacLellan et al. |
| 6,593,684 B1 | 7/2003 | Makita et al. |
| 6,594,684 B1 | 7/2003 | Hodjat et al. |
| 6,597,956 B1 | 7/2003 | Aziz et al. |
| 6,606,602 B1 | 8/2003 | Kolls |
| 6,615,373 B2 | 9/2003 | Elko et al. |
| 6,625,643 B1 | 9/2003 | Colby et al. |
| 6,633,868 B1 | 10/2003 | Min et al. |
| 6,640,241 B1 | 10/2003 | Ozzie et al. |
| 6,647,373 B1 | 11/2003 | Carlton-Foss |
| 6,654,759 B1 | 11/2003 | Brunet et al. |
| 6,654,807 B2 | 11/2003 | Farber et al. |
| 6,671,676 B1 | 12/2003 | Shacham |
| 6,681,251 B1 | 1/2004 | Leymann |
| 6,697,801 B1 | 2/2004 | Eldredge et al. |
| 6,701,342 B1 | 3/2004 | Bartz et al. |
| 6,714,987 B1 | 3/2004 | Amin et al. |
| 6,717,694 B1 | 4/2004 | Fukunaga et al. |
| 6,735,200 B1 | 5/2004 | Novaes |
| 6,738,736 B1 | 5/2004 | Bond |
| 6,748,416 B2 | 6/2004 | Carpenter |
| 6,752,663 B2 | 6/2004 | Farrell et al. |
| 6,799,208 B1 | 9/2004 | Sankaranarayan et al. |
| 6,816,905 B1 | 11/2004 | Sheets et al. |
| 6,816,907 B1 | 11/2004 | Mei et al. |
| 6,823,346 B2 | 11/2004 | MacLellan et al. |
| 6,941,865 B2 | 9/2005 | Kato |
| 6,954,739 B1 | 10/2005 | Bouillet et al. |
| 6,963,285 B2 | 11/2005 | Fischer et al. |
| 7,050,184 B1 | 5/2006 | Miyamoto |
| 7,055,052 B2 | 5/2006 | Chalasani et al. |
| 7,080,077 B2 | 7/2006 | Ramamurthy et al. |
| 7,086,086 B2 | 8/2006 | Ellis |
| 7,093,259 B2 | 8/2006 | Pulsipher et al. |
| 7,096,248 B2 | 8/2006 | Masters et al. |
| 7,123,375 B2 | 10/2006 | Nobutani et al. |
| 7,124,062 B2 | 10/2006 | Gebhart |
| 7,171,654 B2 | 1/2007 | Werme et al. |
| 7,181,302 B2 | 2/2007 | Bayne et al. |
| 7,181,743 B2 | 2/2007 | Werme |
| 7,234,032 B2 | 6/2007 | Durham et al. |
| 7,243,121 B2 | 7/2007 | Neiman et al. |
| 7,243,147 B2 | 7/2007 | Hodges et al. |
| 7,245,584 B2 | 7/2007 | Goringe et al. |
| 7,266,547 B2 | 9/2007 | Bao et al. |
| 7,269,757 B2 | 9/2007 | Lieblich et al. |
| 7,272,732 B2 | 9/2007 | Farkas et al. |
| 7,283,935 B1 | 10/2007 | Pritchard et al. |
| 7,293,092 B2 | 11/2007 | Sukegawa |
| 7,340,654 B2 | 3/2008 | Bigagli et al. |
| 7,406,691 B2 | 7/2008 | Fellenstein et al. |
| 7,426,267 B1 | 9/2008 | Caseau |
| 7,433,931 B2 | 10/2008 | Richoux |
| 7,437,675 B2 | 10/2008 | Casati et al. |
| 7,451,106 B1 | 11/2008 | Gindlesperger |
| 7,464,159 B2 | 12/2008 | Di Luoffo et al. |
| 7,467,196 B2 | 12/2008 | Di Luoffo et al. |
| 7,472,079 B2 | 12/2008 | Fellenstein et al. |
| 7,472,112 B2 | 12/2008 | Pfeiger et al. |
| 7,502,850 B2 | 3/2009 | Fellenstein et al. |
| 7,533,168 B1 | 5/2009 | Pabla et al. |
| 7,533,170 B2 | 5/2009 | Fellenstein et al. |
| 7,539,627 B2 | 5/2009 | Schmidt |
| 7,552,437 B2 | 6/2009 | Di Luoffo et al. |
| 7,562,035 B2 | 7/2009 | Fellenstein et al. |
| 7,562,143 B2 | 7/2009 | Fellenstein et al. |
| 7,571,120 B2 | 8/2009 | Fellenstein et al. |
| 7,584,274 B2 | 9/2009 | Bond et al. |
| 7,590,623 B2 | 9/2009 | Fellenstein et al. |
| 7,620,706 B2 | 11/2009 | Jackson |
| 7,664,844 B2 | 2/2010 | Di Luoffo et al. |
| 7,668,741 B2 | 2/2010 | Ernest et al. |
| 7,707,288 B2 | 4/2010 | Dawson et al. |
| 7,712,100 B2 | 5/2010 | Fellenstein et al. |
| 7,734,679 B2 | 6/2010 | Di Luoffo et al. |
| 7,739,155 B2 | 6/2010 | Fellenstein et al. |
| 7,743,142 B2 | 6/2010 | Fellenstein et al. |
| 7,761,557 B2 | 7/2010 | Fellenstein et al. |
| 7,788,375 B2 | 8/2010 | Fellenstein et al. |
| 7,793,308 B2 | 9/2010 | Gusler et al. |
| 7,921,133 B2 | 4/2011 | Bao et al. |
| 8,136,118 B2 | 3/2012 | Di Luoffo et al. |
| 8,275,881 B2 | 9/2012 | Fellenstein et al. |
| 8,346,591 B2 | 1/2013 | Fellenstein et al. |
| 8,387,058 B2 | 2/2013 | Fellenstein et al. |
| 8,396,757 B2 | 3/2013 | Fellenstein et al. |
| 2002/0023168 A1 | 2/2002 | Bass et al. |
| 2002/0057684 A1 | 5/2002 | Miyamoto et al. |
| 2002/0072974 A1 | 6/2002 | Pugliese et al. |
| 2002/0103904 A1 | 8/2002 | Hay |
| 2002/0116488 A1 | 8/2002 | Subramanian et al. |
| 2002/0147578 A1 | 10/2002 | O'Neil et al. |
| 2002/0152305 A1 | 10/2002 | Jackson et al. |
| 2002/0152310 A1 | 10/2002 | Jain |
| 2002/0165979 A1 | 11/2002 | Vincent |
| 2002/0171864 A1 | 11/2002 | Sesek |
| 2002/0188486 A1 | 12/2002 | Gil et al. |
| 2003/0011809 A1 | 1/2003 | Suzuki et al. |
| 2003/0023499 A1 | 1/2003 | Das et al. |
| 2003/0036886 A1 | 2/2003 | Stone |
| 2003/0041010 A1 | 2/2003 | Yonao-Cowan |
| 2003/0058797 A1 | 3/2003 | Izmailov et al. |
| 2003/0088671 A1 | 5/2003 | Klinker et al. |
| 2003/0101263 A1 | 5/2003 | Bouillet et al. |
| 2003/0105868 A1 | 6/2003 | Kimbrel et al. |
| 2003/0108018 A1 | 6/2003 | Dujardin et al. |

(56) References Cited

U.S. PATENT DOCUMENTS

| | | |
|---|---|---|
| 2003/0110419 A1 | 6/2003 | Banerjee et al. |
| 2003/0112809 A1 | 6/2003 | Bharali et al. |
| 2003/0115099 A1 | 6/2003 | Burns et al. |
| 2003/0120701 A1 | 6/2003 | Pulsipher et al. |
| 2003/0126240 A1 | 7/2003 | Vosseler |
| 2003/0126265 A1 | 7/2003 | Aziz et al. |
| 2003/0128186 A1 | 7/2003 | Laker |
| 2003/0140143 A1 | 7/2003 | Wolf et al. |
| 2003/0145084 A1 | 7/2003 | Mcnerney |
| 2003/0161309 A1 | 8/2003 | Karuppiah |
| 2003/0172061 A1 | 9/2003 | Krupin et al. |
| 2003/0191795 A1 | 10/2003 | Bernardin et al. |
| 2003/0195813 A1 | 10/2003 | Pallister et al. |
| 2003/0200347 A1 | 10/2003 | Weitzman |
| 2003/0204485 A1 | 10/2003 | Triggs |
| 2003/0204758 A1 | 10/2003 | Singh |
| 2003/0212782 A1 | 11/2003 | Canali et al. |
| 2004/0003077 A1 | 1/2004 | Bantz |
| 2004/0015976 A1 | 1/2004 | Lam |
| 2004/0019624 A1 | 1/2004 | Sukegawa |
| 2004/0059729 A1 | 3/2004 | Krupin et al. |
| 2004/0064548 A1 | 4/2004 | Adams et al. |
| 2004/0078471 A1 | 4/2004 | Yang |
| 2004/0093381 A1 | 5/2004 | Hodges et al. |
| 2004/0095237 A1 | 5/2004 | Chen et al. |
| 2004/0098606 A1 | 5/2004 | Tan et al. |
| 2004/0103339 A1 | 5/2004 | Chalasani et al. |
| 2004/0120256 A1 | 6/2004 | Park |
| 2004/0128186 A1 | 7/2004 | Breslin et al. |
| 2004/0128374 A1 | 7/2004 | Hodges et al. |
| 2004/0145775 A1 | 7/2004 | Kubler et al. |
| 2004/0193461 A1 | 9/2004 | Keohane et al. |
| 2004/0213220 A1 | 10/2004 | Davis |
| 2004/0215590 A1 | 10/2004 | Kroening |
| 2004/0215973 A1 | 10/2004 | Kroening |
| 2004/0225711 A1 | 11/2004 | Burnett et al. |
| 2005/0015437 A1 | 1/2005 | Strait |
| 2005/0021349 A1 | 1/2005 | Chiliotis et al. |
| 2005/0021742 A1 | 1/2005 | Yemini et al. |
| 2005/0027691 A1 | 2/2005 | Brin et al. |
| 2005/0027785 A1 | 2/2005 | Bozak et al. |
| 2005/0027865 A1 | 2/2005 | Bozak et al. |
| 2005/0041583 A1 | 2/2005 | Su et al. |
| 2005/0044228 A1 | 2/2005 | Birkestrand et al. |
| 2005/0065994 A1 | 3/2005 | Creamer |
| 2005/0071843 A1 | 3/2005 | Guo et al. |
| 2005/0108394 A1 | 5/2005 | Braun |
| 2005/0120160 A1 | 6/2005 | Plouffe et al. |
| 2005/0132041 A1 | 6/2005 | Kundu |
| 2005/0138162 A1 | 6/2005 | Byrnes |
| 2005/0138175 A1 | 6/2005 | Kumar et al. |
| 2005/0149294 A1 | 7/2005 | Gebhart |
| 2005/0154789 A1 | 7/2005 | Fellenstein et al. |
| 2005/0155033 A1 | 7/2005 | Di Luoffo et al. |
| 2005/0160318 A1 | 7/2005 | Di Luoffo et al. |
| 2005/0160423 A1 | 7/2005 | Bantz et al. |
| 2005/0182838 A1 | 8/2005 | Sheets et al. |
| 2005/0187797 A1 | 8/2005 | Johnson |
| 2005/0187977 A1 | 8/2005 | Frost |
| 2005/0188088 A1 | 8/2005 | Fellenstein et al. |
| 2005/0192968 A1 | 9/2005 | Beretich et al. |
| 2005/0234937 A1 | 10/2005 | Ernest et al. |
| 2005/0257079 A1 | 11/2005 | Arcangeli |
| 2005/0278287 A1 | 12/2005 | Bao et al. |
| 2005/0283788 A1 | 12/2005 | Bigagli et al. |
| 2006/0047802 A1 | 3/2006 | Iszlai et al. |
| 2006/0048157 A1 | 3/2006 | Dawson et al. |
| 2006/0059492 A1 | 3/2006 | Fellenstein et al. |
| 2006/0064698 A1 | 3/2006 | Miller et al. |
| 2006/0069621 A1 | 3/2006 | Chang et al. |
| 2006/0075041 A1 | 4/2006 | Antonoff et al. |
| 2006/0075042 A1 | 4/2006 | Wang et al. |
| 2006/0149576 A1 | 7/2006 | Ernest et al. |
| 2006/0149652 A1 | 7/2006 | Fellenstein et al. |
| 2006/0149714 A1 | 7/2006 | Fellenstein et al. |
| 2006/0149842 A1 | 7/2006 | Dawson et al. |
| 2006/0150157 A1 | 7/2006 | Fellenstein et al. |
| 2006/0150158 A1 | 7/2006 | Fellenstein et al. |
| 2006/0150159 A1 | 7/2006 | Fellenstein et al. |
| 2006/0150190 A1 | 7/2006 | Gusler et al. |
| 2006/0152756 A1 | 7/2006 | Fellenstein et al. |
| 2006/0155633 A1 | 7/2006 | Fellenstein et al. |
| 2006/0167828 A1 | 7/2006 | Di Luoffo et al. |
| 2006/0167984 A1 | 7/2006 | Fellenstein et al. |
| 2006/0168584 A1 | 7/2006 | Dawson et al. |
| 2006/0288251 A1 | 12/2006 | Jackson |
| 2006/0294218 A1 | 12/2006 | Tanaka et al. |
| 2006/0294238 A1 | 12/2006 | Naik |
| 2007/0022425 A1 | 1/2007 | Jackson |
| 2007/0250489 A1 | 10/2007 | Bao et al. |
| 2008/0059554 A1 | 3/2008 | Dawson et al. |
| 2008/0168451 A1 | 7/2008 | Challenger et al. |
| 2008/0183721 A1 | 7/2008 | Bhogal et al. |
| 2008/0222024 A1 | 9/2008 | Fellenstein et al. |
| 2008/0222025 A1 | 9/2008 | Fellenstein et al. |
| 2008/0256228 A1 | 10/2008 | Fellenstein et al. |
| 2008/0306866 A1 | 12/2008 | Fellenstein et al. |
| 2008/0307250 A1 | 12/2008 | Di Luoffo et al. |
| 2009/0013222 A1 | 1/2009 | Di Luoffo et al. |
| 2009/0083425 A1 | 3/2009 | Bozak et al. |
| 2009/0132703 A1 | 5/2009 | Fellenstein et al. |
| 2009/0138594 A1 | 5/2009 | Fellenstein et al. |
| 2009/0216883 A1 | 8/2009 | Fellenstein et al. |
| 2009/0228892 A1 | 9/2009 | Di Luoffo et al. |
| 2009/0240547 A1 | 9/2009 | Fellenstein et al. |
| 2009/0259511 A1 | 10/2009 | Fellenstein et al. |
| 2009/0313299 A1 | 12/2009 | Bonev et al. |

FOREIGN PATENT DOCUMENTS

| | | |
|---|---|---|
| EP | 1109353 | 6/2001 |
| EP | 1267552 | 12/2002 |
| JP | 08-272638 A | 10/1996 |
| JP | 2000-066904 A | 3/2000 |
| JP | 2000-194572 A | 7/2000 |
| JP | 2002-182932 A | 6/2002 |
| JP | 2003-067199 A | 3/2003 |
| JP | 2003-233515 A | 8/2003 |
| WO | 00/74313 A1 | 7/2000 |
| WO | 03/067494 A1 | 8/2003 |

OTHER PUBLICATIONS

Moore, Justin; David Irwin, Laura Grit, Sara Sprenkle, Jeff Chase, "Managing Mixed-Use Clusters with Cluster-on-Demand", 2002, citeseer, Duke University, pp. 1-12.*

Japanese Patent Office Action, Information Material for IDS, dated Oct. 27, 2010, 2 pages.

Office Action, U.S. Appl. No. 11/767,502, filed Jun. 23, 2007, Zhendong Bao, Mailed Jun. 25, 2009, pp. 1-14.

Weng et al, "A cost-based online scheduling algorithm for job assignment on computational grids", Springer-Verlag Berlin Heidelberg, 2003, pp. 343-351.

Andrade et al, "Our grid: An approach to easily assemble grids with equitable resource sharing", Springer-Verlag Berlin Heidelberg, 2003, pp. 61-86.

Chase, JS et al, "Dynamic Virtual Clusters in a Grid Site Manager," High Performance Distributed Computing 2003. Proceedings, 12th IEEE International Symposium, Jun. 22-24, 2003, Piscataway, NJ USA, IEEE, pp. 90-100.

Office Action, U.S. Appl. No. 10/940,452, filed Sep. 14, 2004, Craig Fellenstein, Mailed Jun. 23, 2009, pp. 1-13.

In re Fellenstein, USPTO Office Action, U.S. Appl. No. 12/435,370, filed May 4, 2009, mailing date Sep. 1, 2010, 43 pages.

In re Fellenstein, USPTO Notice of Allowance, U.S. Appl. No. 12/491,172, filed Jun. 24, 2009, mailing date Jun. 24, 2009, 17 pages.

In re Fellenstein, USPTO Office Action, U.S. Appl. No. 12/480,939, filed Jun. 9, 2009, mailing date Sep. 9, 2010, 13 pages.

In re Bao, USPTO Office Action, U.S. Appl. No. 11/767,502, filed Jun. 23, 2007, mailing date Jul. 12, 2010, 35 pages.

(56) References Cited

OTHER PUBLICATIONS

In re Fellenstein, Notice of Allowance, U.S. Appl. No. 12/125,879, filed May 22, 2008, mail date Jan. 29, 2010, 24 pages.
In re Fellenstein, Notice of Allowance, U.S. Appl. No. 11/031,490, filed Jan. 6, 2006, mail date Mar. 9, 2010, 12 pages.
In re Fellenstein, Notice of Allowance, U.S. Appl. No. 12/359,216, filed Jan. 23, 2009, mail date Feb. 1, 2010, 25 pages.
In re Fellenstein, Office Action, U.S. Appl. No. 12/491,172, filed Jun. 24, 2009, mail date Apr. 6, 2010, 30 pages.
In re Fellenstein, Office Action, U.S. Appl. No. 12/196,287, filed Aug. 22, 2008, mail date Mar. 30, 2010, 24 pages.
In re Fellenstein, Office Action, U.S. Appl. No. 11/031,489, filed Jan. 6, 2005, mail date Apr. 5, 2010, 28 pages.
TTI Cluster Computing Services on Demand, ClusterOnDemand.com, publicly available and archived by Arhive.org on or before Dec. 8, 2004, 4 pages.
In re Fellenstein, Notice of Allowance, U.S. Appl. No. 12/364,469, filed Feb. 2, 2009, mail date Apr. 14, 2010, 16 pages.
In re Gusler, Office Action, U.S. Appl. No. 11/031,426, filed Jan. 6, 2005, mail date Apr. 29, 201, 26 pages.
Office Action, U.S. Appl. No. 11/031,426, filed Jan. 6, 2005, Carl Philip Gusler et al., Mailed Nov. 13, 2009, 21 Pages.
Notice of Allowance, U.S. Appl. No. 11/031,403, filed Jan. 6, 2005, Leslie Mark Ernest et al., Mailed Oct. 5, 2009, 15 Pages.
Joseph, Joshy and Fellenstein, Craig, "Grid Computing", IBM Press, Dec. 30, 2003, ISBN-10: 0-13-145660-1, 378 pages in print edition, also available online from <http://my.safaribooksonline.com/book/software-engineering-and-development/grid-computing/0131456601>.
U.S. Appl. No. 12/470,225, filed May 21, 2009, Vincent Valentino Di Luoffo, Non-Final Office Action, mailed May 12, 2011, 64 pages.
"IBM Girds for Grids". McConnell, Chris. Enterprise System Journal, Oct. 2001, 1 page.
"Grid Computing set for big growth". Tanner, John, America's Network, vol. 107, No. 8, May 15, 2003, 6 pages.
Office Action, U.S. Appl. No. 12/125,892, filed May 22, 2008, mailed Aug. 26, 2009.
Office Action, U.S. Appl. No. 12/125,879, filed May 22, 2008, mailed Sep. 15, 2009.
Notice of Allowance, U.S. Appl. No. 12/194,989, filed Aug. 20, 2008, mailed Sep. 30, 2009.
Fellenstein et al, Notice of Allowance, U.S. Appl. No. 12/480,939, filed Jun. 9, 2009, mailing date Mar. 3, 2011, 55 pages.
Final Office Action, U.S. Appl. No. 12/435,370, filed May 4, 2009, Craig Fellenstein, mailing date Mar. 22, 2011, 43 pages.
Office Action, U.S. Appl. No. 12/211,243, filed Sep. 16, 2008, Di Luoffo et al, Mailed Aug. 12, 2009, pp. 1-18.
Office Action, U.S. Appl. No. 11/031,542, filed Jan. 6, 2005, Dawson et al, Mailed Jul. 7, 2009, pp. 1-15.
Cao et a "Grid Flow: Workflow Management for Grid Computing", Cluster Computing and the Grid, 2003, Proceedings. CCGrid 2003. 3rd IEEE/ACM International Symposium on : Publication Date May 12-15, 2003.
Moore et al, "Managing Mixed Use Clusters with Cluster on Demand", Duke University, Nov. 2002.
In re Vincent Valentino Di Luoffo, Notice of Allowance, U.S. Appl. No. 12/211,243, filed Sep. 16, 2003, mail date Dec. 31, 2009, 18 pages.
In re Fellenstein, Final Office Action, U.S. Appl. No. 11/031,490, filed Jan. 6, 2005, mail date Dec. 28, 2009, 21 pages.
In re Fellenstein, Notice of Allowance, U.S. Appl. No. 12/364,469, filed Feb. 2, 2009, mail date Jan. 5, 2010, 27 pages.
In re Fellenstein, Supplemental Notice of Allowance, U.S. Appl. No. 12/364,469, filed Feb. 2, 2009, mail date Jan. 19, 2010, 7 pages.
In re Fellenstein, Notice of Allowance, U.S. Appl. No. 11/031,542, filed Jan. 6, 2005, mail date Dec. 8, 2009, 35 pages.
In re Fellenstein, Notice of Allowance, U.S. Appl. No. 10/940,452, filed Sep. 14, 2004, mail date Dec. 16, 2009, 28 pages.

U.S. Appl. No. 10/756,134, filed Jan. 13, 2004, US Patent 7,406,691, Fellenstein et al, Notice of Allowance, mailing date Apr. 22, 2008, 12 pages.
U.S. Appl. No. 10/756,134, filed Jan. 13, 2004, US Patent 7406691, Fellenstein et al, Office Action, mailing date Oct. 31, 2007, 17 pages.
U.S. Appl. No. 10/757,270, filed Jan. 14, 2004, US Patent 7,464,159, Di Luoffo et al, Notice of Allowance, mailing date Aug. 4, 2008, 10 pages.
U.S. Appl. No. 10/757,270, filed Jan. 14, 2004, US Patent 7,464,159, Di Luoffo et al, Office Action, mailing date Jan. 24, 2008, 20 pages.
U.S. Appl. No. 10/757,282, filed Jan. 14, 2004, Di Luoffo et al, US Patent 7,552,437, Final Rejection, mailing date Jun. 28, 2008, 27 pages.
U.S. Appl. No. 10/757,282, filed Jan. 14, 2004, Di Luoffo et al, US Patent 7,552,437, Notice of Allowance, mailing date Feb. 24, 2009, 10 pages.
U.S. Appl. No. 10/757,282, filed Jan. 14, 2004, Di Luoffo et al, US Patent 7,552,437, Office Action, mailing date Dec. 26, 2007, 16 pages.
U.S. Appl. No. 10/756,138, filed Jan. 13, 2004, Fellenstein et al, US Patent 7562143, Final Office Action, mailing date Jun. 5, 2008, 31 pages.
U.S. Appl. No. 10/756,138, filed Jan. 13, 2004, Fellenstein et al, US Patent 7562143, Notice of Allowance, mailing date Feb. 6, 2008, 51 pages.
U.S. Appl. No. 10/756,138, filed Jan. 13, 2004, Fellenstein et al, US Patent 7562143, Office Action, mailing date Sep. 27, 2007, 49 pages.
U.S. Appl. No. 11/034,304, filed Jan. 12, 2005, US Patent 7,467,196, Di Luoffo et al, Notice of Allowance, mailing date Jul. 1, 2008, 6 pages.
U.S. Appl. No. 11/034,304, filed Jan. 12, 2005, US Patent 7,467,196, Di Luoffo et al, Office Action, mailing date Nov. 28, 2007, 26 pages.
U.S. Appl. No. 11/031,403, filed Jan. 6, 2005, US Patent 7668741, Ernest et al, Office Action, mailing date Apr. 24, 2009, 28 pages.
U.S. Appl. No. 12/194,989, filed Aug. 20, 2008, Di Luoffo et al, US Patent 7664844, Office Action, mailing date Apr. 16, 2009, 5 pages.
U.S. Appl. No. 11/034,303, filed Jan. 12, 2008, Fellenstein et al, US Patent 7562035, Notice of Allowance, mailing date Mar. 9, 2009, 9 pages.
U.S. Appl. No. 11/034,303, filed Jan. 12, 2008, Fellenstein et al, US Patent 7562035, Office Action, mailing date Sep. 17, 2008, 35 pages.
U.S. Appl. No. 11/034,335, filed Jan. 12, 2005, Fellenstein et al, US Patent 7472079, Notice of Allowance, mailing date Aug. 7, 2008, 7 pages.
U.S. Appl. No. 11/034,335, filed Jan. 12, 2005, Fellenstein et al, US Patent 7472079, Office Action, mailing date Feb. 22, 2008, 29 pages.
U.S. Appl. No. 11/031,541, filed Jan. 6, 2005, US Patent 7533170, Fellenstein et al, Notice of Allowance, mailing date Oct. 31, 2008, 14 pages.
U.S. Appl. No. 11/031,541, filed Jan. 6, 2005, US Patent 7533170, Fellenstein et al, Office Action, mailing date May 20, 2008, 35 pages.
U.S. Appl. No. 11/031,543, filed Jan. 6, 2005, US Patent 7590623, Fellenstein et al, Office Action, mailing date Dec. 7, 2007, 17 pages.
U.S. Appl. No. 11/031,543, filed Jan. 6, 2005, US Patent 7590623, Fellenstein et al, Office Action, mailing date Jan. 27, 2009, 25 pages.
U.S. Appl. No. 11/031,543, filed Jan. 6, 2005, US Patent 7590623, Fellenstein et al, Notice of Allowance, mailing date May 11, 2009, 72 pages.
U.S. Appl. No. 11/031,543, filed Jan. 6, 2005, US Patent 7590623, Fellenstein et al, Office Action, mailing date Jun. 25, 2007, 41 pages.
U.S. Appl. No. 11/031,543, filed Jan. 6, 2005, US Patent 7590623, Fellenstein et al, Office Action, mailing date Jul. 10, 2008, 45 pages.
U.S. Appl. No. 11/031,403, filed Jan. 6, 2005, US Patent 7668741, Ernest et al, Office Action, mailing date Oct. 24, 2008, 346 pages.
U.S. Appl. No. 11/031,427, filed Jan. 6, 2005, US Patent 7502850, Fellenstein et al, Notice of Allowance, mailing date Oct. 23, 2008, 14 pages.
U.S. Appl. No. 11/031,427, filed Jan. 6, 2005, US Patent 7502850, Fellenstein et al, Office Action, mailing date May 12, 2008, 26 pages.
U.S. Appl. No. 10/865,270, filed Jun. 10, 2004, US Patent 7266547, Bao et al, Notice of Allowance, mailing date May 3, 2007, 9 pages.

(56) References Cited

OTHER PUBLICATIONS

U.S. Appl. No. 11/767,502, filed Jun. 23, 2007, US Publication 20070250489, Bao et al, Notice of Allowance, mailing date Oct. 22, 2010, 11 pages.
U.S. Appl. No. 11/031,426, filed Jan. 6, 2005, US Patent 7793308, Gusler et al, Notice of Allowance, mailing date Apr. 29, 2010, 26 pages.
U.S. Appl. No. 10/865,270, filed Jun. 10, 2004, US Patent 7266547, Bao et al, Office Action, mailing date Nov. 7, 2006, 20 pages.
U.S. Appl. No. 11/034,305, filed Jan. 12, 2005, US Patent 7571120, Fellenstein et al, Office Action, mailing date Oct. 2, 2008, 33 pages.
U.S. Appl. No. 11/034,305, filed Jan. 12, 2005, US Patent 7571120, Fellenstein et al, Notice of Allowance, mailing date Mar. 24, 2009, 10 pages.
U.S. Appl. No. 12/491,172, filed Jun. 24, 2009, Fellenstein et al, Notice of Allowance, mailing date Jul. 28, 2010, 13 pages.
U.S. Appl. No. 11/031,489, filed Jan. 6, 2005, US Publication 20060149652, Fellenstein et al, Final Office Action, mailing date Nov. 26, 2010, 78 pages.
U.S. Appl. No. 12/491,172, filed Jun. 24, 2009, Fellenstein et al, Notice of Allowance, mailing date Nov. 19, 2010, 29 pages.
U.S. Appl. No. 12/491,172, filed Jun. 24, 2009, Fellenstein et al, Notice of Allowance, mailing date Dec. 21, 2010, 10 pages.
U.S. Appl. No. 12/211,243, filed Sep. 16, 2008, US Patent 7,734,679, Di Luoffo et al, Office Action, mailing date Jun. 12, 2009, 18 pages.
U.S. Appl. No. 11/031,426, filed Jan. 6, 2005, US Patent 7793308, Gusler et al, Office Action, mailing date Apr. 1, 2009, 42 pages.
U.S. Appl. No. 12/143,776, filed Jun. 21, 2008, Craig Fellenstein, Non-Final Office Action, mailed Jan. 6, 2012, 93 pages.
Hai et al, Fault-Tolerant Grid Architecture and Practice, Jul. 2003, vol. 18, pp. 423-433, J Computer Sci and Technology, 11 pages.
Rolia, Jerry et al., Service Centric Computing—Next Generation Internet Computing, 2002, Springer-Verlag Berlin Heidelberg, 17 pages.
Belloum, Adam et al, VLAM-G: a grid based virtual laboratory, 2002, Future Generation Computer Systems 19, Elsevier Science, B.V., 9 pages.
Min, D. and Mutka M., Efficient Job Scheduling in a Mesh Multicomputer Without Discrimination Against Large Jobs, 1995, IEEE, 8 pages.
What's So Great About Grid, Ivan Schneider, Wall Street & Technology, New York, Jul. 2004, p. 24, 4 pages [recovered from Proquest on Sep. 12, 2008], 5 pages.
SGI and Platform Computing Announce Global Alliance for Grid Computing Solutions, PR Newswire, New York, Jul. 16, 2002, [recovered from Proquest on Sep. 12, 2008], 3 pages.
Ding et al "An Agent Model for Managing Distributed Software Resources in Grid Environment", 2003, ICCS, LNCS 2685, p. 971-980, 10 pages.
Al-Theneyan, Ahmed Hamdan, "A Policy-Based Resource Brokering Environment for Computations Grids", 2002, Ph. D, dissertation, Old Dominican Unviersity, US—Virginia, 238 pages.
Leff, Avraham, Rayfield, James T., Dias, Daniel M. "Service-Level Agreements and Commercial Grids." IEEE Internet Computing (Jul.-Aug. 2003): pp. 44-50. Discloses monitoring and enforcing SLAs (p. 48-49), 7 pages.
Hill, J R. "A Management platform for commercial Web Services." BT Technology Journal (Jan. 2004): vol. 22 No. 1 pp. 52-62) discloses SLA enforcement in grid environment, 11 pages.
Alexander Keller and Heiko Ludwig, "The WSLA Framework: Specifying and Monitoring Service Level Agreements for Web Services." Journal of Network and Systems Management, vol. 11, No. 1, Mar. 2003 ( C 2003): p. 57-81, 25 pages.
Menasce, Daniel A., and Casalicchio, Emiliano "QoS in Grid Computing" IEEE Internet Computing (Jul.-Aug. 2004): pp. 85-87, 4 pages.
T Boden, "The grid enterprise—structuring the agile business of the future." BT Technology Journal—vol. 22 No. 1 • Jan. 2004: pp. 107-117, 12 pages.

Tcherevik, Dmitri; Managing the Service-Oriented Architecture (SOA) and On-Demand Computing; copyright 2004 Computer Associates International, Inc., pp. 1-11.
Sven Graupner et al., "Management +=Grid", reference numeral HPL 2003-114, copyright Hewlett-Packard Company 2003, pp. 1-2, available at http://www.hpl.hp.com/techreports/2003/HPL-2003-114.html as of Nov. 14, 2004.
Baden, Mr Hughes and Steven, Dr Bird (2003) Grid-Enabling Natural Language Engineering by Stealth. In Proceedings HLT-NAACL03 Workshop on the Software Engineering and Architecture of Language Technology Systems, pp. 31-38, Edmonton, Canada, available from http://eprints.unimelb.edu.au/archive/00000491 as of May 3, 2004.
Zhu et al., "Scheduling Optimization for resource-intensive Web requests on server clusters", ACM Symposium on Parallel Algorithms and Architectures, 1999, p. 13-22.
Rumsewicz et al, "Preferential Load Balancing for Distributed Internet Servers", Cluster Computing and the Grid, Proceedings. First IEEE/ACM International Symposium, May 2001, p. 363-370.
Kim et al., "Request Rate adaptive dispatching architecture for scalable Internet Server", Cluster Computing, 2000, Proceedings. IEEE conference on Nov. 28-Dec. 1, 2000, p. 289-296.
Casalicchio et al, "Scalable Web Clusters with Static and Dynamic Contents", Cluster Computing, 2000, Proceedings. IEEE conference on Nov. 28-Dec. 1, 2000, p. 170-177.
Fox et al, "Cluster-based scalable network services", Oct. 1997 ACM SIGOPS Operating Systems Review, Proceedings of the 16.sup.th ACM symposium on operating systems principles, vol. 31, Issue 5, p. 78-91.
"Foster et al.; The Anatomy of the Grid, Enabling Scalable Virtual Organizations; available at www.globus.org/research/papers/anatomy.pdf as of Nov. 27, 2003, 25 pages."
"Foster et al.; The Physiology of the Grid, An Open Grid Services Architecture for Distributed Systems Integration; available at www.globus/org/research/papers/ogsa.pdf as of Nov. 27, 2003, 31 pages."
"Foster, Ian; What is the Grid? A Three Point Checklist; available at www-fp.mcs.anl.gov/~foster/Articles/WhatIsTheGrid.pdf as of Nov. 27, 2003, 4 pages."
"Ferreira et al.; IBM Redpaper—Globus Toolkit 3.0 Quick Start; available at www.redbooks.ibm.com/redpapers/pdfs/redp369 as of Nov. 27, 2003, 36 pages."
"IBM Grid Computing—What is Grid Computing; available at www-1.ibm.com/grid/about_grid/what_is.shtml as of Nov. 27, 2003, 1 page."
"Berstis, Viktors; IBM Redpaper—Fundamentals of Grid Computing; available at www.redbooks.ibm.com/redpapers/pdfs/redp3613.pdf as of Nov. 27, 2003, 28 pages."
"Jacob, Bart; IBM Grid Computing—Grid Computing: What are the key components?; available at www-106.ibm.com/developerworks/grid/library/gr-overview/ as of Nov. 27, 2003, 7 pages."
Unger et al.; IBM Grid Computing—A Visual Tour of Open Grid Services Architecture; available at www-106.ibm.com/developerworks/grid/library/gr-visual/ as of Nov. 27, 2003, 9 pages.
Edited by Rajkumar Buyya; Grid Computing Info Centre: Frequently Asked Questions (FAQ); available at http://www.cs.mu.oz.au/~raj/GridInfoware/ gridfaq.html as of Nov. 27, 2003, 3 pages.
Massie ML et al, "The Ganglia Distributed Monitoring System: Design, Implementation, and Experience" Parallel Computing Elsevier Netherlands, vol. 30, No. 7, Jul. 2004, pp. 817-840 24 pages.
Fenglian Xu et al, "Tools and Support for Deploying Applications on the Grid" Services Computing, 2004. Proceedings 2004 International Conference on Shanghai, China, Sep. 15-18, 2004, Piscataway, NJ, IEEE, pp. 281-287, 7 pages.
Ian Foster and Carl Kesselman, "Grid2—Blueprint for a New Computing Infrastructure" 2004, Elsevier, San Francisco, CA, chapter 20, Instrumentation and Monitoring, pp. 319-343, 13 pages.
Smallen S et al, "The Inca Test Harness and Reporting Framework" Supercomputing 2004. Proceedings of the ACM/IEEE SC2004 Conference Pittsburgh, PA, Nov. 2004, p. 1-10, 10 pages.
Allen G, et al, "The Cactus Worm: Experiments with Dynamic Resource Discovery and Allocation in a Grid Environment", Inter-

(56) References Cited

OTHER PUBLICATIONS national Journal of High Performance Computing Applications, Sage Science Press, Thousand Oaks, US, vol. 15, No. 4, 2001, pp. 345-358, 14 pages.
Hwa Min Lee, "A Fault Tolerance Service for QoS in Grid Computing", Lecture Notes in Computer Science, vol. 2659, Aug. 2003, pp. 286-296, 11 pages.
Tianyi Zang, et al, "The Design and Implementation of an OGSA-based grid information service" Web Services, 2004. Proceedings IEEE International Conference on San Diego CA, Piscataway, NJ, IEEE, Jul. 6, 2004, pp. 566-573, 8 pages.
Sample N, et al, "Scheduling Under Uncertainty: Planning for the Ubiquitous Grid", Coordination Models and Languages, 5th International Conference, Coordination 2002. Proceedings (Lecture Notes in Computer Science, vol. 2315) Springer-Varlag Berlin, Germany, 2002, pp. 300-316, 17 pages.
Geyer DH, et al, "WWW-based high performance computing support of acoustic matched field processing", MTS/IEEE Oceans 2001. An Ocean Odessey. Conference Proceedings (IEEE Cat. No. 01CH37295) Marine Technology Soc. Washington, DC, vol. 4, 2001, pp. 2541-2548, 8 pages.
Method of Providing On-Demand-Computing for Server Blades, IP.com Journal, IP.com Inc., West Henrietta, NY, US, Sep. 8, 2003, 1 page.
Kubicek, C, et al., "Dynamic Allocation of Servers to Jobs in a Grid Hosting Environment", By Technology Journal, vol. 22, No. 3, Jul. 2004, pp. 251-260, 10 pages.
Yang, Kun, et al, "Network Engineering Towards Efficient Resource On-Demand in Grid Computing", Communication Technology Proceedings, 2003, ICCT 2003, International Conference on Apr. 9-11, 2003, Piscataway, NJ, USA, IEEE, vol. 2, Apr. 9, 2003, pp. 1715-1718, 4 pages.
Bodhuin et al, "Using Grid Technologies for Web-enabling Legacy Systems", Research Centre on Software Technology, available at http://www.bauhaus-stuttgart.de/sam/bodhuin.pdf as of at least Jun. 21, 2004.
IBM, "Process and method for IT energy optimization", Research Disclosure, Feb. 2002, pp. 366-367, 2 pages.
Gillmor, Steve, "Ahead of the curve, Grid Will Hunting", InfoWorld; Feb. 25, 2002;24, p. 66, 1 page.
Notice of Allowance, U.S. Appl. No. 12/470,225, filed May 21, 2009, Vincent Valentino Di Luoffo, mailing date Nov. 4, 2011, 26 pages.
Notice of Allowance, mailing date Jul. 19, 2012, U.S. Appl. No. 12/480,939, filed Jun. 9, 2009, In re Fellenstein, 32 pages.
U.S. Appl. No. 12/491,172, filed Jun. 24, 2009, Craig Fellenstein, Notice of Allowance, mailed Nov. 2, 2012, 57 pages.
Notice of Allowance, U.S. Appl. No. 12/435,370, filed May 4, 2009, In Re Craig Fellenstein, mailing date May 11, 2012, 130 pages.
Krauter et al, A Taxonomy and Survey of Grid Resource Management Systems for Distributed Computing, Sep. 17, 2001, John Wiley & Sons, pp. 1-32.
He et al. "Hybrid performance-based workload management for multiclusters and grids", 2004, IET Journals and Magazines, vol. 8, issue 4, pp. 224-231.
He et al. Dynamic scheduling of parallel jobs with QoS Demands in multiclusters and grids, 2004, Grid Computing, 2004. Proceedings. IEEE/ACM International Workshop, pp. 402-409.
Cao, J., "Self-Organizing agents for grid load balancing", 2004, Grid Computing, 2004. Proceedings. Fifth IEEE/ACM International Workshop, pp. 388-395.
U.S. Appl. No. 12/143,776, filed Jun. 21, 2008, Craig Fellenstein, Notice of Allowance, mailed Aug. 14, 2012, 17 pages.
Cao et al, GridFlow: Workflow management for grid computing, C&C Res. Labs, NEC Eur Ltd, Germany: This paper appears in: Cluster Computing and Grid, 2003. Proceedings. CCGrid 2003. 3rd IEEE/ACL International Symposium; Publication date: May 12-15, 2003, 8 pages.
"The DataGrid Workload Management System: Challenges and Results", Journal of Grid Computing, Springer Netherlands, ISSN 1570-7873 (Print) 1572-9814 (Online), vol. 2, No. 4, Dec. 2004, pp. 353-367.
USPTO Office Action Response in pending U.S. Appl. No. 11/031,490, filed Jan. 6, 2005, Craig William Fellenstein et al, Mailing date: May 29, 2009, 10 pages.
Akhil Sahai et al., "Specifying & Monitoring Guarantees in Commercial Grids through SLA", reference No. HPL-2002-324, copyright Hewlett-Packard Company 2002, pp. 1-8, available at http://www.hpl.hp.com/techreports/2002/HPL-2002-324.html as of Nov. 14, 2004.
"Error Handling in a Synchronous Dataflow Network", original pub. date Dec. 1998 (Research Disclosure, Article No. 416140, vol. 41, No. 416), IPCOM000123508D.
IBM Technical Disclosure Bulletin, "Error-Handling Mechanism for Automated Problem Determination Service Agents on IBM Local Area Network Server Network", vol. 39, No. 10, pp. 191-192, published Oct. 1996, copyright IBM.
Applicants' Response to the USPTO, filed Jan. 31, 2008, U.S. Appl. No. 10/756,134, filed Jan. 13, 2004, US Patent 7,406,691, issued Jul. 29, 2008, Fellenstein et al, International Business Machines Corporation, 17 pages.
Applicants' Response to the USPTO, filed Apr. 4, 2012, U.S. Appl. No. 12/143,776, filed Jun. 21, 2008, US Patent 8,387,058, issued Feb. 26, 2013, Fellenstein et al, International Business Machines Corporation, 17 pages.
Applicants' Response to the USPTO, filed Apr. 24, 2008, U.S. Appl. No. 10/757,270, filed Jan. 14, 2004, US Patent 7,464,159, issued Dec. 9, 2008, Di Luoffo et al, International Business Machines Corporation, 13 pages.
Applicants' Response to the USPTO, filed Nov. 12, 2009, U.S. Appl. No. 12/211,243, filed Sep. 16, 2008, US Patent 7734679, issued Jun. 8, 2010, Di Luoffo et al, International Business Machines Corporation, 7 pages.
Applicants' Response to the USPTO, filed Mar. 26, 2008, U.S. Appl. No. 10/757,282, filed Jan. 14, 2004, US Patent 7,552,437, issued Jun. 23, 2009, Di Luoffo et al, International Business Machines Corporation, 14 pages.
Applicants' Response to the USPTO, filed Nov. 28, 2008, U.S. Appl. No. 10/757,282, filed Jan. 14, 2004, US Patent 7,552,437, issued Jun. 23, 2009, Di Luoffo et al, International Business Machines Corporation, 17 pages.
Applicants' Response to the USPTO, filed Aug. 12, 2011, U.S. Appl. No. 12/470,225, filed May 21, 2009, US Patent 8,136,118, issued Mar. 13, 2012, Di Luoffo et al, International Business Machines Corporation, 27 pages.
Applicants' Response to the USPTO, filed Feb. 27, 2008, U.S. Appl. No. 10/756,134, filed Jan. 13, 2004, US Patent 7,562,143, issued Jul. 14, 2009, Fellenstein et al, International Business Machines Corporation, 19 pages.
Applicants' Response to the USPTO, filed Dec. 31, 2010, U.S. Appl. No. 12/435,370, filed May 4, 2009, US Patent 8,275,881, issued Sep. 25, 2012, Fellenstein et al, International Business Machines Corporation, 27 pages.
Applicants' Response to the USPTO, filed Jun. 21, 2011, U.S. Appl. No. 12/435,370, filed May 4, 2009, US Patent 8,275,881, issued Sep. 25, 2012, Fellenstein et al, International Business Machines Corporation, 20 pages.
Applicants' Response to the USPTO, filed Jan. 2, 2009, U.S. Appl. No. 11/034,305, filed Jan. 12, 2005, US Patent 7,571,120, issued Aug. 4, 2009, Fellenstein et al, International Business Machines Corporation, 14 pages.
Applicants' Response to the USPTO, filed Jun. 17, 2010, U.S. Appl. No. 12/491,172, filed Jun. 24, 2009, US Patent 8,396,757, issued Mar. 12, 2013, Fellenstein et al, International Business Machines Corporation, 10 pages.
Applicants' Response to the USPTO, filed Feb. 28, 2008, U.S. Appl. No. 11/034,304, filed Jan. 12, 2005, US Patent 7,467,196, issued Dec. 16, 2008, Di Luoffo et al, International Business Machines Corporation, 10 pages.

(56) References Cited

OTHER PUBLICATIONS

Applicants' Response to the USPTO, filed Jul. 16, 2009, U.S. Appl. No. 12/194,989, filed Aug. 20, 2008, US Patent 7,664,844, issued Feb. 16, 2010, Di Luoffo et al, International Business Machines Corporation, 8 pages.

Applicants' Response to the USPTO, filed Dec. 10, 2008, U.S. Appl. No. 11/034,303, filed Jan. 12, 2005, US Patent 7,562,035, issued Jul. 14, 2009, Fellenstein et al, International Business Machines Corporation, 13 pages.

Applicants' Response to the USPTO, filed Dec. 9, 2010, U.S. Appl. No. 12/480,939, filed Jun. 9, 2009, US Patent 8,346,591, issued Jan. 1, 2013, Fellenstein et al, International Business Machines Corporation, 12 pages.

Applicants' Response to the USPTO, filed May 22, 2008, U.S. Appl. No. 11/034,335, filed Jan. 12, 2005, US Patent 7,472,079, issued Dec. 30, 2008, Fellenstein et al, International Business Machines Corporation, 8 pages.

Applicants' Response to the USPTO, filed Dec. 15, 2009, U.S. Appl. No. 12/125,879, filed May 22, 2008, US Patent 7,739,155, issued Jun. 15, 2010, Fellenstein et al, International Business Machines Corporation, 18 pages.

Applicants' Response to the USPTO, filed Aug. 26, 2009, U.S. Appl. No. 11/031,490, filed Jan. 6, 2005, US Patent 7,761,557 issued Jul. 20, 2010, Fellenstein et al, International Business Machines Corporation, 19 pages.

Applicants' Response to the USPTO, filed Jan. 19, 2010, U.S. Appl. No. 11/031,490, filed Jan. 6, 2005, US Patent 7,761,557 issued Jul. 20, 2010, Fellenstein et al, International Business Machines Corporation, 12 pages.

Applicants' Response to the USPTO, filed Jul. 29, 2008, U.S. Appl. No. 11/031,541, filed Jan. 6, 2005, US Patent 7,533,170, issued May 12, 2009, Fellenstein et al, International Business Machines Corporation, 14 pages.

Applicants' Response to the USPTO, filed Oct. 7, 2009, U.S. Appl. No. 11/031,542, filed Jan. 6, 2005, US Patent 7,707,288, issued Apr. 27, 2010, Dawson et al, International Business Machines Corporation, 23 pages.

Applicants' Response to the USPTO, filed Sep. 25, 2007, U.S. Appl. No. 11/031,543, filed Jan. 6, 2005, US Patent 7,590,623, issued Sep. 15, 2009, Fellenstein et al, International Business Machines Corporation, 19 pages.

Applicants' Response to the USPTO, filed Oct. 10, 2008, U.S. Appl. No. 11/031,543, filed Jan. 6, 2005, US Patent 7,590,623, issued Sep. 15, 2009, Fellenstein et al, International Business Machines Corporation, 20 pages.

Applicants' Response to the USPTO, filed Apr. 27, 2009, U.S. Appl. No. 11/031,543, filed Jan. 6, 2005, US Patent 7,590,623, issued Sep. 15, 2009, Fellenstein et al, International Business Machines Corporation, 26 pages.

Office Action from the USPTO, mailing date Apr. 5, 2010, U.S. Appl. No. 11/031,489, filed Jan. 6, 2005, Fellenstein et al, International Business Machines Corporation, 27 pages.

Applicants' Response to the USPTO, filed Sep. 4, 2010, U.S. Appl. No. 11/031,489, filed Jan. 6, 2005, Fellenstein et al, International Business Machines Corporation, 26 pages.

Final Office Action from the USPTO, mailing date Nov. 26, 2010, U.S. Appl. No. 11/031,489, filed Jan. 6, 2005, Fellenstein et al, International Business Machines Corporation, 31 pages.

Applicants' Response to the USPTO, filed Jan. 23, 2009, U.S. Appl. No. 11/031,403, filed Jan. 6, 2005, US Patent 7668,741, issued Feb. 23, 2010, Ernest et al, International Business Machines Corporation, 27 pages.

Applicants' Response to the USPTO, filed Jul. 24, 2009, U.S. Appl. No. 11/031,403, filed Jan. 6, 2005, US Patent 7668,741 issued Feb. 23, 2010, Ernest et al, International Business Machines Corporation, 28 pages.

Applicants' Response to the USPTO, filed Jul. 1, 2009, U.S. Appl. No. 11/031,426, filed Jan. 6, 2005, US Patent 7793308, issued Sep. 7, 2010, Gusier et al, International Business Machines Corporation, 13 pages.

Applicants' Response to the USPTO, filed Feb. 15, 2010, U.S. Appl. No. 11/031,426, filed Jan. 6, 2005, US Patent 7793308, issued Sep. 7, 2010, Gusler et al, International Business Machines Corporation, 16 pages.

Applicants' Response to the USPTO, filed Jul. 28, 2008, U.S. Appl. No. 11/031,427, filed Jan. 6, 2005, US patent 7502850, issued Mar. 10, 2009, Fellenstein et al, International Business Machines Corporation, 15 pages.

Applicants' Response to the USPTO, filed Feb. 7, 2007, U.S. Appl. No. 10/865,270, filed Jun. 20, 2004, US patent 7266547, issued Sep. 4, 2007, Bao et al, International Business Machines Corporation, 22 pages.

Applicants' Response to the USPTO, filed Nov. 23, 2009, U.S. Appl. No. 11/767,502, filed Jun. 23, 2007, US patent 7,921,133, issued Apr. 5, 2011, Bao et al, International Business Machines Corporation, 25 pages.

Applicants' Response to the USPTO, filed Mar. 25, 2010, U.S. Appl. No. 11/767,502, filed Jun. 23, 2007, US patent 7,921,133, issued Apr. 5, 2011, Bao et al, International Business Machines Corporation, 25 pages.

Applicants' Response to the USPTO, filed Aug. 23, 2010, U.S. Appl. No. 11/767,502, filed Jun. 23, 2007, US patent 7,921,133, issued Apr. 5, 2011, Bao et al, International Business Machines Corporation, 13 pages.

Non-Final Office Action from the USPTO, mailing date Jun. 23, 2009, U.S. Appl. No. 10/940,452, filed Sep. 14, 2004, US patent 7712100, issued May 4, 2010, Fellenstein et al, International Business Machines Corporation, 17 pages.

Applicants' Response to the USPTO, filed Sep. 23, 2009, U.S. Appl. No. 10/940,452, filed Sep. 14, 2004, US patent 7712100, issued May 4, 2010, Fellenstein et al, International Business Machines Corporation, 24 pages.

Notice of Allowance from the USPTO, mailing date Dec. 16, 2009, U.S. Appl. No. 10/940,452, filed Sep. 14, 2004, US patent 7712100, issued May 4, 2010, Fellenstein et al, International Business Machines Corporation, 30 pages.

\* cited by examiner

← 702

| SERVER | OS | CPU FREE | MEMORY FREE | STORAGE AVAIL | NETWORK AVAIL |
|---|---|---|---|---|---|
| PSERIES01 | AIX 5.2 | 20% | 1020 MB | 10000 MB | EN2, EN3, EN4 |
| PSERIES02 | AIX 5.2 | 18% | 1088 MB | 10000 MB | EN2, EN3, EN4 |
| PSERIES03 | AIX 5.2 | 15% | 1404 MB | 10000 MB | EN2, EN3, EN4 |
| PSERIES04 | AIX 5.2 | 22% | 0911 MB | 10000 MB | EN2, EN3, EN4 |
| PSERIES11 | AIX 5.2 | 18% | 1018 MB | 10000 MB | EN2, EN3, EN4 |
| PSERIES12 | AIX 5.2 | 24% | 0866 MB | 10000 MB | EN2, EN3, EN4 |
| XSERIES03 | LINUX | 58% | 1676 MB | 12500 MB | ETHER1, ETHER2 |
| XSERIES04 | LINUX | 62% | 1822 MB | 12500 MB | ETHER1, ETHER2 |
| XSERIES05 | LINUX | 60% | 1773 MB | 12500 MB | ETHER1, ETHER2 |
| XSERIES06 | LINUX | 62% | 1796 MB | 12500 MB | ETHER1, ETHER2 |
| XSERIES07 | LINUX | 64% | 1688 MB | 12500 MB | ETHER1, ETHER2 |

← 704

| SERVER TYPE | CPU COST | MEMORY COST | STORAGE COST | NETWORK COST | TOTAL HW COST |
|---|---|---|---|---|---|
| PSERIES | $800.00 | $600.00 | $400.00 | $150.00 | $1950.00 |
| XSERIES | $650.00 | $450.00 | $400.00 | $250.00 | $1750.00 |

← 706

| SERVER TYPE | OS LICENSE FEE | DB2EE LICENSE FEE | TOTAL SW COST |
|---|---|---|---|
| PSERIES | $0 | $200.00 | $200.00 |
| XSERIES | $0 | $150.00 | $150.00 |

← 708

| SERVER TYPE | HARDWARE COST | SOFTWARE COST | TOTAL JOB COST |
|---|---|---|---|
| PSERIES | $1950.00 | $200.00 | $2150.00 |
| XSERIES | $1750.00 | $150.00 | $1900.00 |

*Fig. 7*

| IMAGE CONTENT 902 | IMAGE STORAGE RATIONALE 904 | INDEX 906 |
|---|---|---|
| AIX 5.3 BASE IMAGE 910 | - CAN BE USED TO BUILD NEW IMAGES AS FUTURE MAINTENANCE LEVELS ARE RELEASED<br>- CAN BE USED AS A FRESH STARTING POINT IF AN EXISTING MAINTENANCE RELEASE IS SUSPECTED OF CAUSING PROBLEMS IN AN EXECUTION ENVIRONMENT | A5.3 |
| AIX 5.3 MAINTENANCE LEVEL 01 912 | - CAN BE USED TO SELECTIVELY APPLY MAINTENANCE PATCHES OR IN WHOLE TO BRING THE OPERATING SYSTEM UP TO ML1 | AM5.3.1 |
| AIX VERSION 5.3 IMAGE WITH ML1 914 | - CAN BE USED TO RAPIDLY BUILD THE REQUIRED OPERATING SYSTEM AND MAINTENANCE LEVEL ENVIRONMENT USING A SINGLE INSTALLATION PROCESS | A5.3.1 |
| DB2 VERSION 9 BASE IMAGE 916 | - CAN BE USED TO BUILD NEW IMAGES AS FUTURE MAINTENANCE LEVELS ARE RELEASED<br>- CAN BE USED AS A FRESH STARTING POINT IF AN EXISTING MAINTENANCE LEVEL IS SUSPECTED OF CAUSING PROBLEMS IN AN EXECUTION ENVIRONMENT | DB9 |
| DB2 VERSION 9 ML2 918 | - CAN BE USED TO SELECTIVELY APPLY MAINTENANCE PATCHES, OR IN WHOLE TO BRING THE DB SOFTWARE UP TO LEVEL ML2 | DBM9.2 |
| DB2 VERSION 9 IMAGE WITH ML2 920 | - CAN BE USED TO RAPIDLY BUILD THE REQUIRED DB/ML ENVIRONMENT USING A SINGLE INSTALLATION PROCESS | DB9.2 |
| AIX VERSION 5.3 IMAGE INCLUDING DB2 VERSION 9 922 | - CAN BE USED TO RAPIDLY BUILD THE REQUIRED OPERATION SYSTEM AND APPLICATION ENVIRONMENT USING A SINGLE INSTALLATION PROCESS<br>- CAN BE MODIFIED WITH THE LATEST VERSION OF EITHER OR BOTH THE OPERATING SYSTEM AND DATABASE MAINTENANCE LEVELS | A5.3-DB9 |
| AIX VERSION 5.3 IMAGE INCLUDING ML1, DB2 VERSION 9 AND DB ML2 924 | -CAN BE USED TO RAPIDLY BUILD THE LATEST AIX/DB2 ENVIRONMENT USING A SINGLE INSTALLATION PROCESS | A5.3.1-DB9.2 |

*Fig. 9*

AUTOMATED MANAGEMENT OF SOFTWARE IMAGES FOR EFFICIENT RESOURCE NODE BUILDING WITHIN A GRID ENVIRONMENT

CROSS-REFERENCE TO RELATED APPLICATIONS

This application is a continuation of commonly assigned U.S. patent application Ser. No. 11/031,543, filed Jan. 6, 2005, now U.S. Pat. No. 7,590,623 which is hereby incorporated herein by reference.

BACKGROUND OF THE INVENTION

1. Technical Field

The present invention relates in general to improved grid computing and in particular to efficient resource allocation within an on-demand grid environment. Still more particularly, the present invention relates to automated management of the storage and distribution of software images for efficient access by any grid resource for building execution environments within a grid environment.

2. Description of the Related Art

Ever since the first connection was made between two computer systems, new ways of transferring data, resources, and other information between two computer systems via a connection continue to develop. In typical network architectures, when two computer systems are exchanging data via a connection, one of the computer systems is considered a client sending requests and the other is considered a server processing the requests and returning results. In an effort to increase the speed at which requests are handled, server systems continue to expand in size and speed. Further, in an effort to handle peak periods when multiple requests are arriving every second, server systems are often joined together as a group and requests are distributed among the grouped servers. Multiple methods of grouping servers have developed such as clustering, multi-system shared data (sysplex) environments, and enterprise systems. With a cluster of servers, one server is typically designated to manage distribution of incoming requests and outgoing responses. The other servers typically operate in parallel to handle the distributed requests from clients. Thus, one of multiple servers in a cluster may service a client request without the client detecting that a cluster of servers is processing the request.

Typically, servers or groups of servers operate on a particular network platform, such as Unix or some variation of Unix, and provide a hosting environment for running applications. Each network platform may provide functions ranging from database integration, clustering services, and security to workload management and problem determination. Each network platform typically offers different implementations, semantic behaviors, and application programming interfaces (APIs).

Merely grouping servers together to expand processing power, however, is a limited method of improving efficiency of response times in a network. Thus, increasingly, within a company network, rather than just grouping servers, servers and groups of server systems are organized as distributed resources. There is an increased effort to collaborate, share data, share cycles, and improve other modes of interaction among servers within a company network and outside the company network. Further, there is an increased effort to outsource nonessential elements from one company network to that of a service provider network.

Moreover, there is a movement to coordinate resource sharing between resources that are not subject to the same management system, but still address issues of security, policy, payment, and membership. For example, resources on an individual's desktop are not typically subject to the same management system as resources of a company server cluster. Even different administrative groups within a company network may implement distinct management systems.

The problems with decentralizing the resources available from servers and other computing systems operating on different network platforms, located in different regions, with different security protocols and each controlled by a different management system, has led to the development of Grid technologies using open standards for operating a grid environment. Grid environments support the sharing and coordinated use of diverse resources in dynamic, distributed, virtual organizations. A virtual organization is created within a grid environment when a selection of resources, from geographically distributed systems operated by different organizations with differing policies and management systems, is organized to handle a job request. A grid vendor may develop a grid environment to which a buyer may submit grid jobs, for example.

While the open standards defining grid technology facilitate sharing and coordination of diverse resources in dynamic, distributed, virtual organizations, grid standards do not solve all of the problems associated with actually determining how to allocate and group resources into virtual organizations. Further, since grid computing is a relatively new and emerging art, many processes have yet to be considered for automation, and as such, require inefficient manual interaction.

One such process that has yet to be considered for automation is the installation of software resources onto available hardware resources when currently available grid resources do not provide the software environment required for an inbound grid job. In particular, there is a need for a method, system, and program for dynamically managing software resource images to facilitate efficient installation of software resources when building a required software environment on demand within a grid environment.

SUMMARY OF THE INVENTION

In view of the foregoing, the invention provides for efficient resource allocation within an on-demand grid environment through automated management of the storage and distribution of software images for efficient access by any grid resource for building execution environments within a grid environment.

In one embodiment, a computer system for dynamically managing a plurality of software images in a grid environment includes one or more processors and one or more computer-readable tangible storage devices. The computer system includes program instructions, stored on at least one of said one or more storage devices for execution by at least one of said one or more processors, for monitoring, in a first grid service, a grid environment including a plurality of computing systems each comprising at least one resource and communicatively connected over a network to share each said at least one resource through at least one grid service implemented within an open grid services architecture enabling interfacing with each said at least one resource through at least one web service, wherein said first grid service is from among said at least one grid service. The computer system includes program instructions, stored on at least one of said one or more storage devices for execution by at least one of said one or more processors, for detecting a current software environment for a current grid job within said grid environment, wherein said first grid service maintains a catalog of a plurality of software images for installation on hardware resources from among said at least one resource, each of said plurality of software images specified with a separate rationale from among a plurality of required rationales for maintaining each of said plurality of software images in storage. The computer system includes program instructions, stored on at least one of said one or more storage devices for execution by at least one of said one or more processors, for searching said catalog of said plurality of software images to determine whether an image for said current software environment matches one from among said plurality of software images, wherein each of said plurality of software images comprises at least one installation image for a particular software environment, wherein storage of each of said plurality of software images is structured in said catalog for automated efficient access by each of a plurality of resource nodes within said grid environment. The computer system includes program instructions, stored on at least one of said one or more storage devices for execution by at least one of said one or more processors, responsive to not locating said current software environment in said catalog, for automatically evaluating whether storage of said current software environment meets at least one of said plurality of required rationales. The computer system includes program instructions, stored on at least one of said one or more storage devices for execution by at least one of said one or more processors, responsive to said first grid service determining storage of said current software environment meets at least one of said plurality of required rationales, for automatically capturing at least one installation image for said current software environment and storing said captured at least one installation image in said catalog as an additional software image to said plurality of software images.

In another embodiment, a computer program product for dynamically managing a plurality of software images in a grid environment includes one or more computer-readable tangible storage devices. The computer program product includes program instructions, stored on at least one of the one or more storage devices, to monitor, in a first grid service, a grid environment, said grid environment comprising a plurality of computing systems each comprising at least one resource and communicatively connected over a network to share each said at least one resource through at least one grid service implemented within an open grid services architecture enabling interfacing with each said at least one resource through at least one web service, wherein the first grid service is from among said at least one grid service. The computer program product includes program instructions, stored on at least one of the one or more storage devices, to detect a current software environment for a current grid job within said grid environment, wherein said first grid service maintains a catalog of a plurality of software images for installation on hardware resources from among said at least one resource, each of said plurality of software images specified with a separate rationale from among a plurality of required rationales for maintaining each of said plurality of software images in storage. The computer program product includes program instructions, stored on at least one of the one or more storage devices, to search said catalog of said plurality of software images to determine whether an image for said current software environment matches one from among said plurality of software images, wherein each of said plurality of software images comprises at least one installation image for a particular software environment, wherein storage of each of said plurality of software images is structured in said catalog for automated efficient access by each of a plurality of resource nodes within said grid environment. The computer program product includes program instructions, stored on at least one of the one or more storage devices, responsive to not locating said current software environment in said catalog, to automatically evaluate whether storage of said current software environment meets at least one of said plurality of required rationales. The computer program product includes program instructions, stored on at least one of the one or more storage devices, responsive to said first grid service determining storage of said current software environment meets at least one of said plurality of required rationales, to automatically capture at least one installation image for said current software environment and storing said captured at least one installation image in said catalog as an additional software image to said plurality of software images.

BRIEF DESCRIPTION OF THE DRAWINGS

The novel features believed aspect of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 7 is an illustrative table depicting the workload and pricing data collected by a grid allocation service attempting to locate the least costly available resource nodes in accordance with the method, system, and program of the present invention;

FIG. 9 is table illustrating examples of image content, rationale for storage, and indexing references, that may be used by the grid catalog and storage service in accordance with the method, system, and program of the present invention;

DETAILED DESCRIPTION OF THE PREFERRED EMBODIMENT

Figure 1:
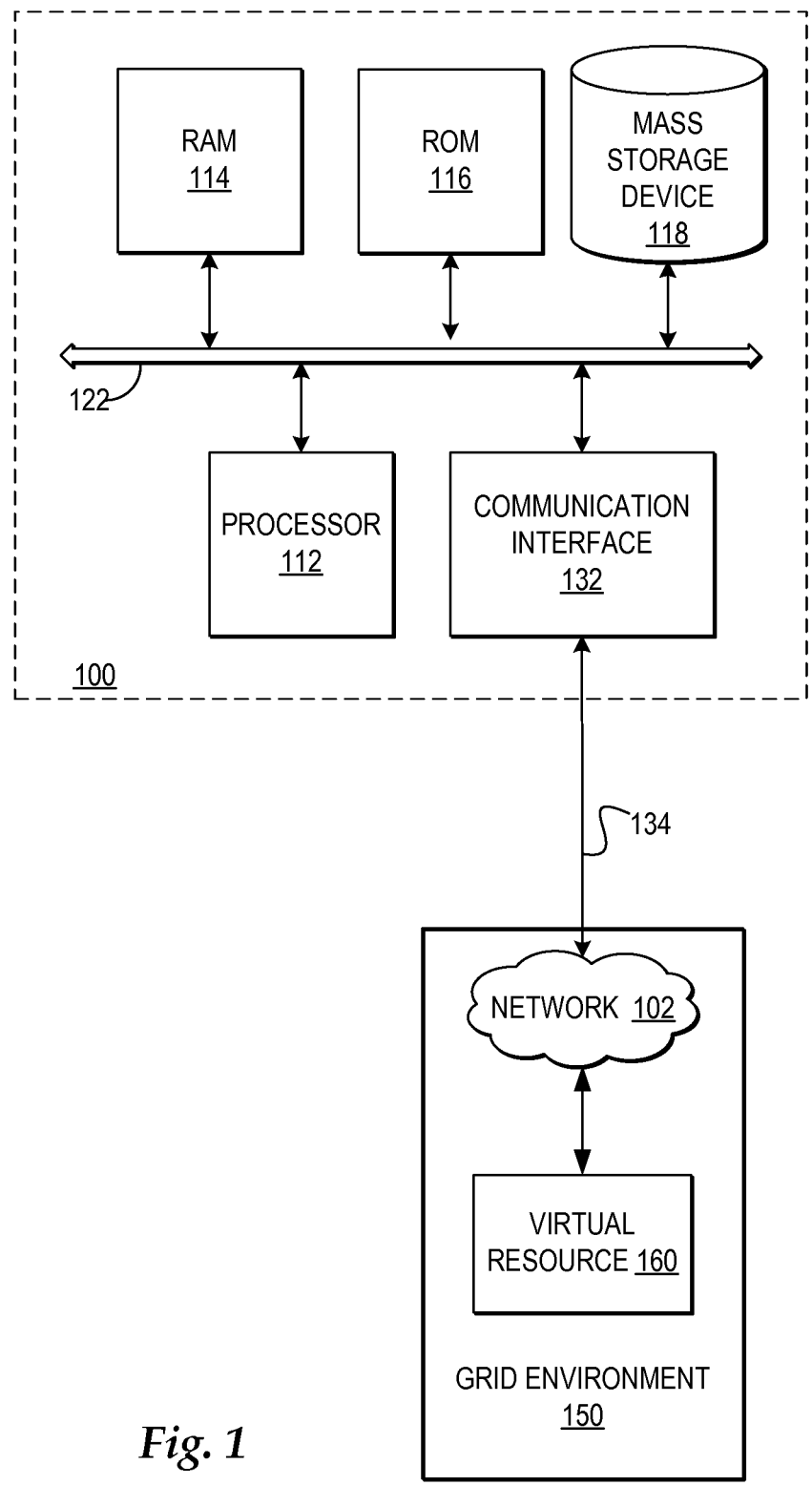
FIG. 1 depicts one embodiment of a computer system which may be implemented in a grid environment and in which the present invention may be implemented.

Referring now to the drawings and in particular to FIG. 1, there is depicted one embodiment of a computer system which may be implemented in a grid environment and in which the present invention may be implemented. As will be further described, the grid environment includes multiple computer systems managed to provide resources. Additionally, as will be further described, the present invention may be executed in a variety of computer systems, including a variety of computing systems, mobile systems, and electronic devices operating under a number of different operating systems managed within a grid environment.

In one embodiment, computer system 100 includes a bus 122 or other device for communicating information within computer system 100, and at least one processing device such as processor 112, coupled to bus 122 for processing information. Bus 122 may include low-latency and higher latency paths connected by bridges and adapters and controlled within computer system 100 by multiple bus controllers. When implemented as a server system, computer system 100 typically includes multiple processors designed to improve network servicing power.

Processor 112 may be a general-purpose processor such as IBM's PowerPC™ processor that, during normal operation, processes data under the control of operating system and application software accessible from a dynamic storage device such as random access memory (RAM) 114 and a static storage device such as Read Only Memory (ROM) 116. The operating system may provide a graphical user interface (GUI) to the user. In one embodiment, application software contains machine executable instructions that when executed on processor 112 carry out the operations depicted in the flowcharts of FIGS. 11-15 and others operations described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 100 to perform a process according to the present invention. The term "machine-readable medium" as used herein refers to any data storage medium that participates in providing instructions to processor 112 or other components of computer system 100 for execution. Such a data storage medium may take many forms including, but not limited to, non-volatile media and volatile media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other data storage medium from which computer system 100 can read and which is suitable for storing instructions. In the present embodiment, an example of a non-volatile medium is mass storage device 118 which as depicted is an internal component of computer system 100, but will be understood to also be provided by an external device. Volatile media include dynamic memory such as RAM 114.

Computer system 100 connects to a virtual resource 160 through a network link 134 (e.g. a modem or network connection) to a communications interface 132 coupled to bus 122. Virtual resource 160 may include a virtual representation of the resources accessible from a single system or systems, wherein multiple systems may each be considered discrete sets of resources operating on independent platforms, but coordinated as a virtual resource by a grid manager. Communications interface 132 provides a two-way data communications coupling to network link 134 that may be connected, for example, to a local area network (LAN), wide area network (WAN), or an Internet Service Provider (ISP) that provide access to network 102. In particular, network link 134 may provide wired and/or wireless network communications to one or more networks, such as network 102, through which use of virtual resources, such as virtual resource 160, is accessible as provided within a grid environment 150. Grid environment 150 may be part of multiple types of networks, including a peer-to-peer network, or may be part of a single computer system, such as computer system 100.

As one example, network 102 may refer to the worldwide collection of networks and gateways that use a particular protocol, such as Transmission Control Protocol (TCP) and Internet Protocol (IP), to communicate with one another. Network 102 uses electrical, electromagnetic, or optical signals that carry digital data streams. The signals through the various networks and the signals on network link 134 and through communication interface 132, which carry the digital data to and from computer system 100, are exemplary forms of carrier waves transporting the information. It will be understood that alternate types of networks, combinations of networks, and infrastructures of networks may be implemented.

When implemented as a server system, computer system 100 typically includes multiple communication interfaces accessible via multiple peripheral component interconnect (PCI) bus bridges connected to an input/output controller. In this manner, computer system 100 allows connections to multiple network computers.

Additionally, although not depicted, multiple peripheral components and internal/external devices may be added to computer system 100, connected to multiple controllers, adapters, and expansion slots coupled to one of the multiple levels of bus 122. For example, a display device, audio device, keyboard, or cursor control device may be added as a peripheral component.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

Figure 2:
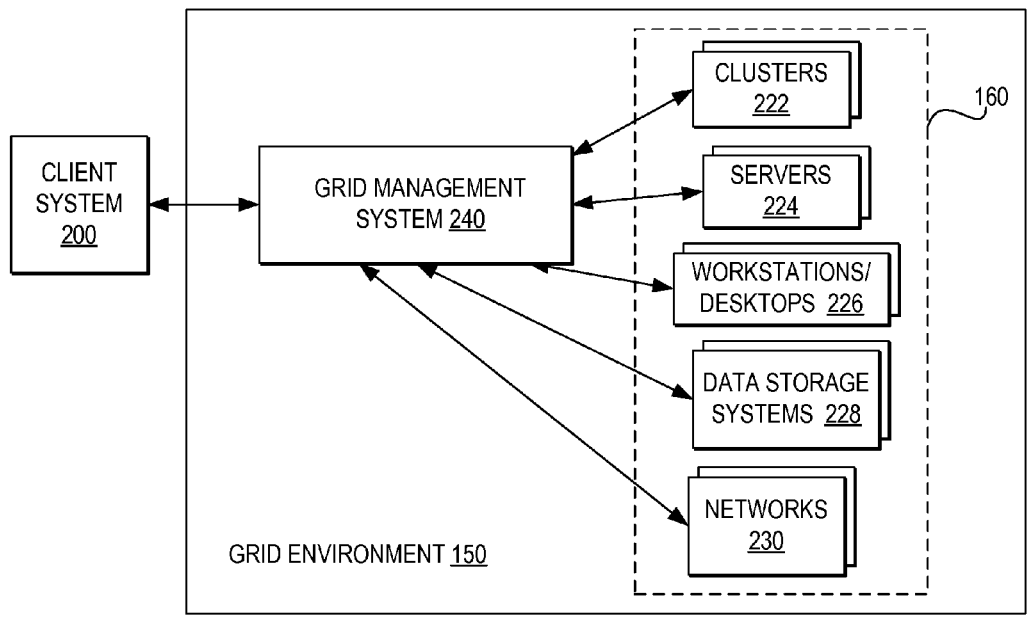
FIG. 2 is block diagram illustrating one embodiment of the general types of components within a grid environment.

With reference now to FIG. 2, a block diagram illustrates one embodiment of the general types of components within a grid environment. In the present example, the components of a grid environment 150 include a client system 200 interfacing with a grid management system 240 which interfaces with server clusters 222, servers 224, workstations and desktops 226, data storage systems 228, and networks 230. For purposes of illustration, the network locations and types of networks connecting the components within grid environment 150 are not depicted. It will be understood, however, that the components within grid environment 150 may reside atop a network infrastructure architecture that may be implemented with multiple types of networks overlapping one another. Network infrastructure may range from multiple large enterprise systems to a peer-to-peer system to a single computer system. Further, it will be understood that the components within grid environment 150 are merely representations of the types of components within a grid environment. A grid environment may simply be encompassed in a single computer system or may encompass multiple enterprises of systems.

It will be understood that grid environment 150 may be provided by a grid vendor, where a cost for use of resources within grid environment 150 may be calculated based on the amount of time required for a grid job to execute or the actual amount of resources used, for example. In addition, it will be understood that grid environment 150 may include grid resources supplied by a single grid vendor, such as a particular business enterprise, or multiple vendors, where each vendor continues to monitor and manage the vendor's group of resources, but grid management system 240 is able to monitor unintended changes across all the resources, regardless of which vendors provide which resources. Further, it will be understood that although resource discovery mechanisms for discovering available grid resources are not depicted, client system 200 or grid management system 240 may discover grid resources advertised from local and global directories available within and outside of grid environment 150.

The central goal of a grid environment, such as grid environment 150 is organization and delivery of resources from multiple discrete systems viewed as virtual resource 160. Client system 200, server clusters 222, servers 224, workstations and desktops 226, data storage systems 228, networks 230 and the systems creating grid management system 240 may be heterogeneous and regionally distributed with independent management systems, but enabled to exchange information, resources, and services through a grid infrastructure enabled by grid management system 240. Further, server clusters 222, servers 224, workstations and desktops 226, data storage systems 228, and networks 230 may be geographically distributed across countries and continents or locally accessible to one another.

In the example, client system 200 interfaces with grid management system 240. Client system 200 may represent any computing system sending requests to grid management system 240. In particular, client system 200 may send virtual job requests (or requests for a quote (RFQs) and jobs to grid management system 240. Further, while in the present embodiment client system 200 is depicted as accessing grid environment 150 with a request, in alternate embodiments client system 200 may also operate within grid environment 150.

While the systems within virtual resource 160 are depicted in parallel, in reality, the systems may be part of a hierarchy of systems where some systems within virtual resource 160 may be local to client system 200, while other systems require access to external networks. Additionally, it is important to note, that systems depicted within virtual resources 160 may be physically encompassed within client system 200.

To implement grid environment 150, grid management system 240 facilitates grid services. Grid services may be designed according to multiple architectures, including, but not limited to, the Open Grid Services Architecture (OGSA). In particular, grid management system 240 refers to the management environment which creates a grid by linking computing systems into a heterogeneous network environment characterized by sharing of resources through grid services.

According to an advantage of the invention, grid management system 240 includes a dynamic build subsystem of grid services that enables grid nodes of grid resources to be built, adapted, or updated to provide an execution environment required for a particular grid job. In particular, a grid node may include a grouping of hardware, software, network, and other types of grid resources built together. In addition, grid management system 240 includes a grid catalog and storage subsystem of grid services that manages the storage and distribution of software images for efficient resource building, as will be further described in detail.

Figure 3:
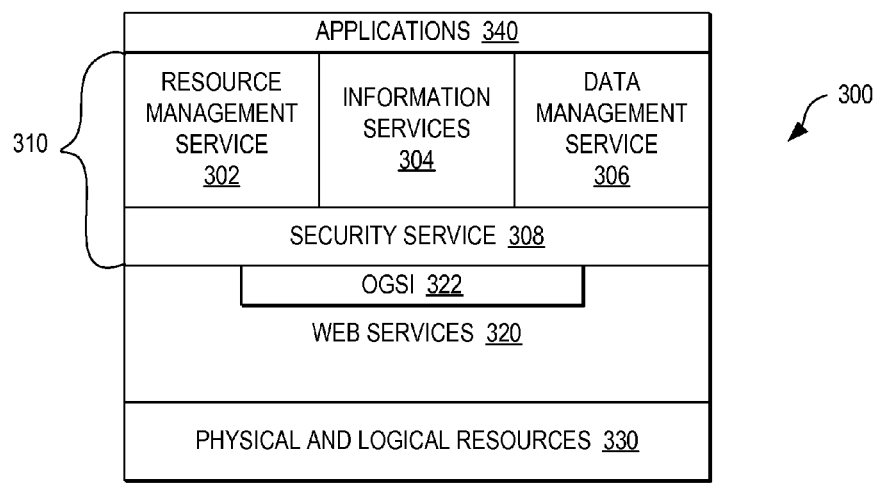
FIG. 3 is a block diagram depicting one example of an architecture that may be implemented in a grid environment.

Referring now to FIG. 3, a block diagram illustrates one example of an architecture that may be implemented in a grid environment. As depicted, an architecture 300 includes multiple layers of functionality. As will be further described, the present invention is a process which may be implemented in one or more layers of an architecture, such as architecture 300, which is implemented in a grid environment, such as the grid environment described in FIG. 2. It is important to note that architecture 300 is just one example of an architecture that may be implemented in a grid environment and in which the present invention may be implemented. Further, it is important to note that multiple architectures may be implemented within a grid environment.

Within the layers of architecture 300, first, a physical and logical resources layer 330 organizes the resources of the systems in the grid. Physical resources include, but are not limited to, servers, storage media, and networks. The logical resources virtualize and aggregate the physical layer into usable resources such as operating systems, processing power, memory, I/O processing, file systems, database managers, directories, memory managers, and other resources.

Next, a web services layer 320 provides an interface between grid services 310 and physical and logical resources 330. Web services layer 320 implements service interfaces including, but not limited to, Web Services Description Language (WSDL), Simple Object Access Protocol (SOAP), and eXtensible mark-up language (XML) executing atop an Internet Protocol (IP) or other network transport layer. Further, the Open Grid Services Infrastructure (OSGI) standard 322 builds on top of current web services 320 by extending web services 320 to provide capabilities for dynamic and manageable Web services required to model the resources of the grid. In particular, by implementing OGSI standard 322 with web services 320, grid services 310 designed using OGSA are interoperable. In alternate embodiments, other infrastructures or additional infrastructures may be implemented a top web services layer 320.

Grid services layer 310 includes multiple services, the combination of which may implement grid management system 240. For example, grid services layer 310 may include grid services designed using OGSA, such that a uniform standard is implemented in creating grid services. Alternatively, grid services may be designed under multiple architectures. Grid services can be grouped into four main functions. It will be understood, however, that other functions may be performed by grid services.

First, a resource management service 302 manages the use of the physical and logical resources. Resources may include, but are not limited to, processing resources, memory resources, and storage resources. Management of these resources includes scheduling jobs, distributing jobs, and managing the retrieval of the results for jobs. Resource management service 302 monitors resource loads and distributes jobs to less busy parts of the grid to balance resource loads and absorb unexpected peaks of activity. In particular, a user may specify preferred performance levels so that resource management service 302 distributes jobs to maintain the preferred performance levels within the grid.

Second, information services 304 manages the information transfer and communication between computing systems within the grid. Since multiple communication protocols may be implemented, information services 304 manages communications across multiple networks utilizing multiple types of communication protocols.

Third, a data management service 306 manages data transfer and storage within the grid. In particular, data management service 306 may move data to nodes within the grid where a job requiring the data will execute. A particular type of transfer protocol, such as Grid File Transfer Protocol (GridFTP), may be implemented.

Finally, a security service 308 applies a security protocol for security at the connection layers of each of the systems operating within the grid. Security service 308 may implement security protocols, such as Open Secure Socket Layers (SSL), to provide secure transmissions. Further, security service 308 may provide a single sign-on mechanism, so that once a user is authenticated, a proxy certificate is created and used when performing actions within the grid for the user.

Multiple services may work together to provide several key functions of a grid computing system. In a first example, computational tasks are distributed within a grid. Data management service 306 may divide up a computation task into separate grid services requests of packets of data that are then distributed by and managed by resource management service 302. The results are collected and consolidated by data management system 306. In a second example, the storage resources across multiple computing systems in the grid are viewed as a single virtual data storage system managed by data management service 306 and monitored by resource management service 302.

An applications layer 340 includes applications that use one or more of the grid services available in grid services layer 310. Advantageously, applications interface with the physical and logical resources 330 via grid services layer 310 and web services 320, such that multiple heterogeneous systems can interact and interoperate.

Figure 4:
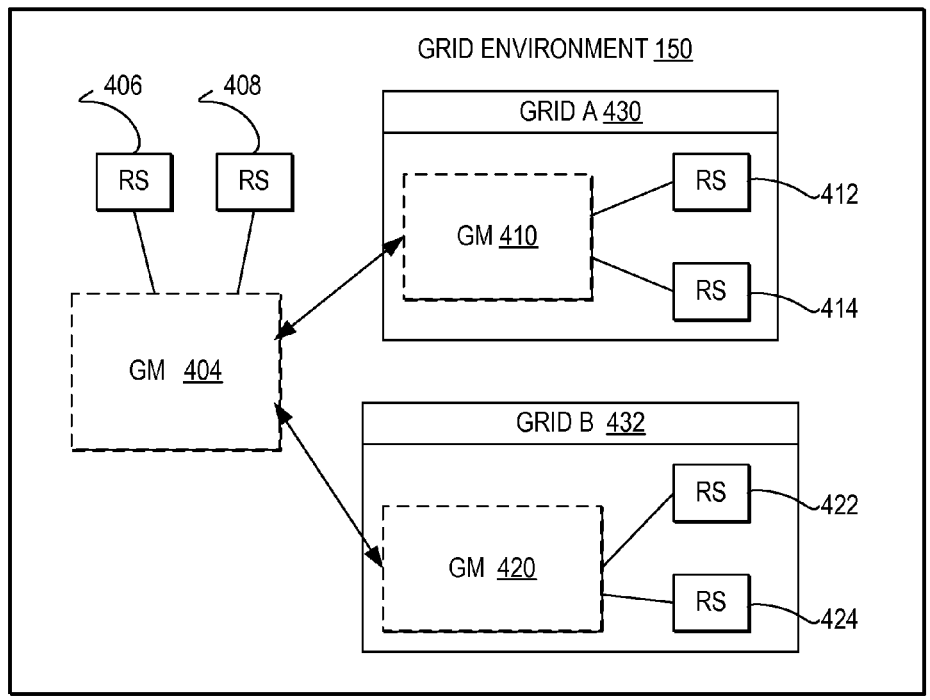
FIG. 4 is a block diagram illustrating an example of a logical representation of the grid management system within a grid environment in accordance with the method, system, and program of the present invention.

With reference now to FIG. 4, there is depicted one illustration of a logical representation of the grid management system within a grid environment in accordance with the method, system, and program of the present invention. As depicted, grid management system 240 is logically represented by multiple grid managers 404, 410, and 420, that are groups of services that perform the functions that provide grid management system 240. Each of grid managers 404, 410, and 420 may provide monitoring, scheduling, and management to resource nodes (RS), such as resource nodes 406, 408, 412, 414, 422, and 424. According to an advantage of the invention, each of grid managers 404, 410, and 420 may include a dynamic build services that controls automated building of resource nodes required for an execution environment for a particular grid job.

In particular, in the example, grid environment 150 includes GM 404 that manages RS 406 and RS 408 and communicates with GM 410 and GM 420. In addition, in the example, grid environment 150 includes multiple groups of resource nodes described by grid A 430 and grid B 432. In one embodiment, Grid A 430 and Grid B 432 are physically disparate groups of resource nodes, but accessible to one another within grid environment 150. For purposes of illustration, where Grid A 430 and Grid B 432 are physically disparate groups of resource nodes, each grid may be considered a local grid to a particular physical location; the GM within each grid manages a set of "local" resources. Thus, in particular GM 410, within grid A 430, manages resource nodes 412 and 414, which are physically local to one another and GM 420, within grid B 432, manages resource nodes 422 and 424, which are physically local to one another. In another embodiment, Grid A 430 and Grid B 432 are logically disparate groups of resource nodes.

In one embodiment, Grid A 430 is managed by one grid vendor and Grid B 432 is managed by another grid vendor. Grid A 430 may function as a buyer by selling off grid jobs or accessing additional resources from Grid B 432. Further, grid environment 150 may include grid groupings managed by a single or multiple grid vendors and grid resources within grid environment 150 may be temporary, permanent, or accessed on-demand, for example.

Figure 5:
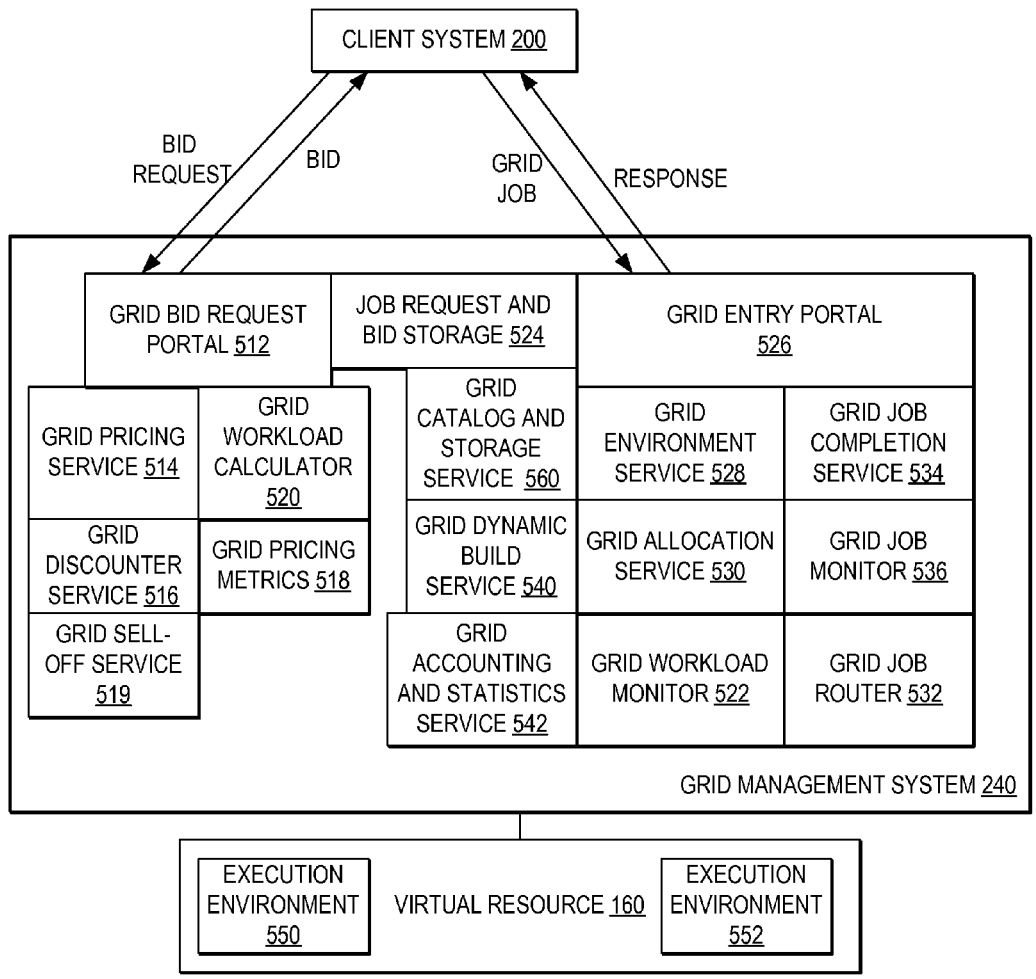
FIG. 5 is a block diagram depicting an automated closed loop grid management system for handling bid requests and grid jobs in accordance with the present invention.

Referring now to FIG. 5, there is depicted a block diagram of an automated closed loop grid management system for handling bid requests and grid jobs in accordance with the present invention. As depicted, grid management system 240 includes multiple subsystems of grid services. In particular, grid management system 240 may include a central grid manager (not depicted) that coordinates the communication between each of the grid services. Alternatively, the grid services may directly communicate with each other within the communication system enabled by grid management system 240.

As depicted, grid management system 240 includes a grid bid request portal 512 that receives virtual job requests, or bid requests, from client systems inside or outside of grid environment 150, such as client system 200. In addition, grid bid request portal 512 may receive bid requests from other grid management systems or grid vendors. Grid bid request portal 512 may function as a grid service and may facilitate multiple bid request entry points.

Grid bid request portal 512 may store bid requests in job request and bid storage 524 for use in tracking the bid request and bid provided for a potential job submission. In particular, job request and bid storage 524 may store a bid request and bid for a limited period of time depending on the size of the storage medium and the number of bid requests received on average over a particular time period.

A bid request may include multiple required characteristics of the potential grid job. For example, the bid request may include characteristics that specify the pricing constraints for a grid job, the time limits for the grid job, eligibility of the grid job for capacity on demand resources, eligibility of the grid job for distribution or sell-off to other grid vendors, limitations on resource usage, job completion requirements, software platform class requirements, hardware platform class requirements, transport mechanism requirements for the grid job, the size of data accesses required for the grid job, and the job performance requirements. It will be understood that additional grid job characteristics and requirements may be included in the bid request that inform grid management system 240 about the potential grid job.

In addition, grid bid request portal 512 interfaces with a grid workload calculator 520 that may function as a grid service. In particular, a grid workload calculator 520 may access a grid workload monitor 522 that monitors the current workload on virtual resource 160 or a selection of resource nodes within virtual resource 160. Grid workload calculator 520 may compare the current workload with past workloads to predict future workloads at particular periods of time or on particular selections of resource nodes within virtual resource 160. In addition, grid workload calculator 520 may calculate an estimated workload factor on grid resources for the bid request, based on the characteristics of the grid job described in the bid request. In one example, a workload factor may indicate the estimated load on multiple resource subsystems based on the bid request and the current and estimated availability of the resource subsystems. For example, the workload factor may indicate the number of CPU cycles that grid workload calculator 520 estimates the potential job will required based on the bid request. In another example, the workload factor may indicate the resources which must be included in a resource node allocated for the grid job. In another example, the workload factor may include a number calculated to represent on a scale of impact on all or a selection of resources by the potential grid job. In yet another example, U.S. patent application Ser. No. 10/940,452, filed 09-14-2004, herein incorporated by references, describes how grid workload calculator 520 calculates workload factors based on the combination of job characteristics.

Grid workload calculator 520 may pass the workload factor to a grid pricing service 514. Grid pricing service 514 then determines whether grid management system 240 can handle the potential grid job, and if so, calculates a price for handling the grid job. In particular, grid pricing service 514 may access a grid discounter service 516, grid pricing metrics module 518, and grid sell-off service 519 to calculate a price for handling the grid job. In one example, U.S. patent application Ser. No. 11/031,489, filed Jan. 6, 2005, herein incorporated by reference, describes how gird pricing service 514 calculates pricing for a bid for a grid job.

Grid bid request portal 512 compiles the workload calculations and pricing calculations into a bid response and controls storage of the bid response in job request and bid storage 524 and distribution of the bid response to client system 200.

A grid entry portal 526 receives grid jobs from client system 200, or other grid management systems and grid environments. In one embodiment, grid entry portal 526 accesses the bid request and bid response for the grid job from job request and bid storage 524 and distributes the bid request and bid with the grid job throughout the grid services of grid management system 240. Grid entry portal 526 may distribute and load balance grid jobs across multiple physical servers providing grid management system 240. Further, the grid service providing grid entry portal 526 may be distributed across multiple physical servers and may function as a grid service.

A grid environment service 528 coordinates access of resource nodes for an incoming grid job. In one example, grid environment service 528 calls a grid allocation service 530 to control the actual allocation of resource nodes that grid environment service 528 determines should be accessible for an incoming grid job. If the types of resource nodes designated by grid environment service 528 are not available, then grid allocation service 530 may direct a grid dynamic build service 540 to build the resource nodes required for the execution environment for the grid job.

Grid dynamic build service 540 may first query whether there are resources available to build the resource nodes required for the execution environment. If the resources are not available, then grid dynamic build service 540 may pass the grid job to a grid sell-off service 519 for controlling the sale of the grid job to another grid environment or may activate on-demand resources. If grid dynamic build service 540 decides to build the resource nodes, then grid dynamic build service 540 may call a grid catalog and storage service 560 to access the cataloged software image required for the resource node. In one example, grid dynamic build service 540 builds together the hardware, software, and network resources required for the grid node. In another example, grid dynamic build service updates or adjusts the software currently loaded on a hardware resource to build a resource node required for a grid job execution environment.

Execution environment 550 and execution environment 552 are examples of groupings of resource nodes allocated for use by a particular grid job or group of grid jobs from among the resources logically referred to as virtual resource 160. It will be understood virtual resource 160 may include any number of execution environments and that resources may overlap between execution environments. In addition, it will be understood that the resource nodes allocated to execution environments 550 and 552 may be redistributed to alternate execution environments. Further, it will be understood that the resource nodes allocated to execution environments 550 and 552 may include resource nodes that are built specifically for allocation in one of the execution environments.

Once resource nodes are allocated to an execution environment for the incoming grid job, a grid job router 532 routes the grid job to the designated resource nodes of the execution environment within virtual resource 160. In one example, grid job router 532 may interact with a grid service that tests and verifies the allocated resource nodes first to ensure that the resource nodes are able to handle the grid job. For example, U.S. patent application Ser. No. 11/031,427, filed Jan. 6, 2005 describes a grid modules that tests and verifies allocated grid resource nodes for compliance with required standards and errors.

A grid job monitor 536, in conjunction with grid workload monitor 522, monitors job completion. In particular, grid workload monitor 522 monitors the workload applied to resource nodes within virtual resource 160. Grid job monitor 536 determines which portions of the monitored workload results of grid workload monitor 522 to attribute to each grid job. Thus, grid job monitor 536 is able to monitor the progress of a particular job, using the monitored workload, and determine whether the grid job executing is meeting performance requirements and other characteristics described for the grid job. If a grid job executing is not meeting performance requirements or other characteristics described for the grid job, grid job monitor 536 may access other grid services, such as grid sell-off service 519 or grid allocation service 530 to request redirecting the grid job to other resources or adding additional resource nodes to handle the grid job. In addition, grid job monitor 536 may interact with an error detection module (not depicted) that detects whether the grid job is executing with any degradation or errors in the execution environment. If an error or degradation is detected, grid job monitor 536 may respond by redirecting the grid job to other resources or adding additional resource nodes to bolster the execution environment.

A grid job completion manager 534 ensures proper completion of each grid job. In particular, grid job completion manager 534 detects from grid job monitor 536 when the grid job is complete and receives the response or result, but may also communicate with other modules to ensure that the grid job is complete. Further, grid job completion manager 534 may update a billing service (not depicted) with the workload usage characteristics of the grid job upon completion so that the billing service may generate a bill for client system 200 for the service provided.

Additionally, once the grid job is completed, grid catalog and storage service 560 may capture and store an image of the software environment within an execution environment in an image catalog. In particular, grid catalog and storage service 560 may update the stored environment image if the current software environment is already stored. If the software environment is not already stored by grid catalog and storage service 560, then grid catalog and storage service 560 may first decide whether to store the software environment image based on whether it is likely that the software environment will be needed again in the future. In one example, grid catalog and storage service 560 may determine the likelihood that the execution environment will be needed again in the future by viewing the bid request for the grid job that used the execution environment and historical data gathered about execution environments used within the grid environment. Then, according to an advantage, grid dynamic build service 540 may call grid catalog and storage service 560 to access the previously stored software installation images required for building resource nodes for the execution environment required by an incoming grid job.

Figure 6:
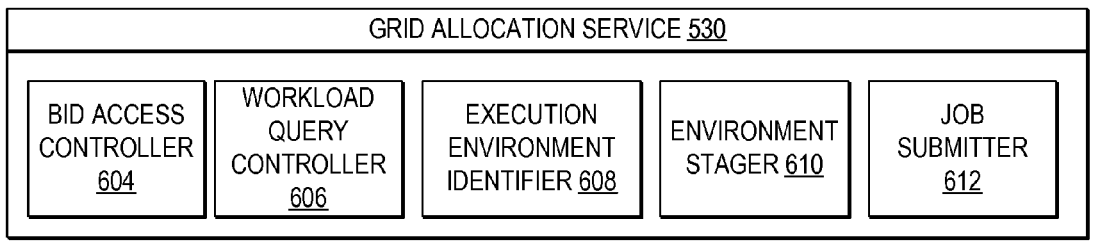
FIG. 6 is a block diagram depicting a grid allocation service in accordance with the method, system, and program of the present invention.

Referring now to FIG. 6, there is depicted a block diagram of a grid allocation service in accordance with the method, system, and program of the present invention. It will be understood that the components depicted as part of grid allocation service 530 may be performed as grid services or processes performed by grid services. Further, it will be understood that grid allocation service 530 may include additional processes. As depicted, grid allocation service 530 includes a bid access controller 604. Bid access controller 604 controls access to the bid or bid request that specifies the quality of service required for a grid job to determine the types of grid resources required for the execution environment for the grid job. In an alternate embodiment, grid environment service 528 passes the required execution environment information retrieved for the incoming grid job to grid allocation service 530.

Next, a workload query controller 606 controls access to the current workload across the grid resources in the grid environment. Execution environment identifier 608 then accesses grid pricing service 514 to determine the total hardware and software costs for use of the available grid resources for the grid job and to identify the lowest cost resources available. In particular, execution environment identifier 608 may calculate hardware and software costs for already built available resource nodes and for resource nodes that will need to be built. If resource nodes need to be built, then execution environment identifier 608 may call grid dynamic build service 540 to actually build the resource nodes identified as the most cost effective.

In identifying the lowest cost resource nodes for an execution environment for an incoming grid job, it is important to note that pricing from the time that a bid is offered for a grid job to the time that the grid job is submitted, may vary, however the bid will likely cap the amount that the customer can be charged, regardless of the current cost for executing the grid job within the grid environment. Further, in identifying the lowest cost resource nodes for an execution environment for an incoming grid job, it is important to note that in addition to price, execution environment identifier 608 may consider other factors, such as the scheduled or predicted workload for a selection of resource nodes, to ensure that all performance requirements for an incoming grid job are met.

Next, once execution environment identifier 608 identifies the resource nodes for an execution environment for an incoming grid job, an environment stager 610 performs configuration modifications required to support grid job router 532 in routing the grid job to the resource nodes.

In a first example, environment stager 610 may increase the capacity of a hardware resource by activating on-demand resources within the hardware resource. In particular, a hardware platform, such as a server, may include excess capacity built into the platform that is only brought on-line and paid for when necessary. In one example, a server may include eight active CPUs and eight capacity on-demand CPUs, where for an inbound grid job requiring eight dedicated CPUs, environment stager 610 may activate the eight capacity on-demand CPUs for the duration of the grid job. It is important to note that when configuring capacity on-demand resources, environment stager 610 may also call grid dynamic build service 540 to build in the other resources necessary for the capacity on-demand resources to function. For example, when capacity on-demand CPUs are brought on-line, environment stager 610 may call grid dynamic build service 540 to build the required base operating system and storage with the capacity on-demand CPUs.

In another example, environment stager 610 may configure partitions within resource nodes to handle a particular grid job or series of grid jobs. In particular, by partitioning resource nodes into a selection of dedicated resources, additional security is provided to a grid job. In partitioning resource nodes, environment stager 610 may also call grid dynamic build service 540 to add or update additional grid resources to a partition.

In yet another example, environment stager 610 may configure a workload manager for a server or selection of servers included in the execution environment for a grid job. In particular, where partitioning is not implemented and a selection of servers execute multiple grid jobs concurrently, the workload manager for the servers will limit each grid job to use of a particular percentage of the available resources. For example, environment stager 610 may configure the workload manager to cap a grid job to access to 60% of the two available CPUs.

Further, environment stager 610 may configure the storage locations for use by a grid job. In one example, a storage server resource available within a grid environment may include a large pool of disk resources available for use by other grid resources. For example, using IBM'S Enterprise Storage Server (ESS), multiple servers can see all the available storage and any storage which is not currently in use by one service can be brought on-line by another server. Thus, environment stager 610 may call available storage on-line for the grid job and return the storage to the pool of disk resources when the grid job is complete.

Further, environment stager 610 may configure IP addresses and IP aliases for the servers included in the execution environment for a grid job. In one example, environment stager 610 may apply IP addresses known by the grid job or applications required for the grid job, to a network adapter which is not currently in use and has been selected as a resource for the grid job execution environment. In another example, if the network adapter selected as a resource for the grid job execution environment is shared with other grid jobs, then environment stager 610 would configure IP aliases on the shared network adapter.

Finally, once environment stager 610 completes the configuration of the execution environment, job submitter 612 will inform grid job router 532 and other services within grid management system 240 that the execution environment for the grid job is prepared and that the grid job can be routed to the execution environment. Alternatively, if execution environment identifier 608 decides to sell the grid job to another grid environment through grid sell-off service 519, then job submitter 612 notifies the other services in grid management system 240 of the sell-off.

With reference now to FIG. 7, there is depicted an illustrative table of the workload and pricing data collected by a grid allocation service attempting to locate the least costly available resource nodes in accordance with the method, system, and program of the present invention. As illustrated, the workload results returned by workload query controller for the resource nodes that meet the type of resource nodes required for a particular grid job are depicted at reference numeral 702. In the example, as illustrated at reference numeral 702, multiple available pSeries and xSeries servers are identified (pSeries and xSeries are registered trademarks of International Business Machines Corporation). The operating system type and version currently loaded on each server is designated in addition to the percentage of free CPU cycles, amount of free memory, amount of storage available, and network resources available.

Next, execution environment identifier 608 accesses grid pricing service 514 to determine the current total hardware resource cost including, but not limited to, cost for CPU usage, memory, storage, and network resources for each hardware platform, as required by the particular job, as illustrated at reference numeral 704. It will be understood that although not depicted, the cost for usage of each resource may be calculated according to as granular of unit as possible or may be part of an agreed to price for the client requesting the grid job.

Additionally, execution environment identifier 608 also accesses grid pricing service 514 to determine the current total software resource cost including, but not limited to, cost for the operating system licensing fee, cost for the database software, as required by the particular grid job, as illustrated at reference numeral 706. In the example, the database software required for the grid job is DB2EE, however, it will be understood that other application software may be required for a grid job. Further, it will be understood that in addition to operating system and application software, other types of software may be required for a grid job.

Finally, execution environment identifier 608 calculates a total job cost per hardware platform. In the example, as depicted at reference numeral 708, execution environment identifier 608 calculates the total job cost for performing a grid job both the pSeries platform and the xSeries platforms. In the example, the total job cost for performing the grid job on the xSeries platform is less expensive than the total job cost for performing the grid job, so execution environment identifier 608 will select one of the available xSeries servers unless other grid job requirement criteria override the lowest cost selection.

It is important to note that when grid allocation service 506 selects available hardware resources and calculates costs for operating system and application software required for the grid job execution environment, grid allocation service 506 may still call the dynamic build service to actually build the hardware platform with the required operating system and application software or update the software with maintenance level updates.

Figure 8:
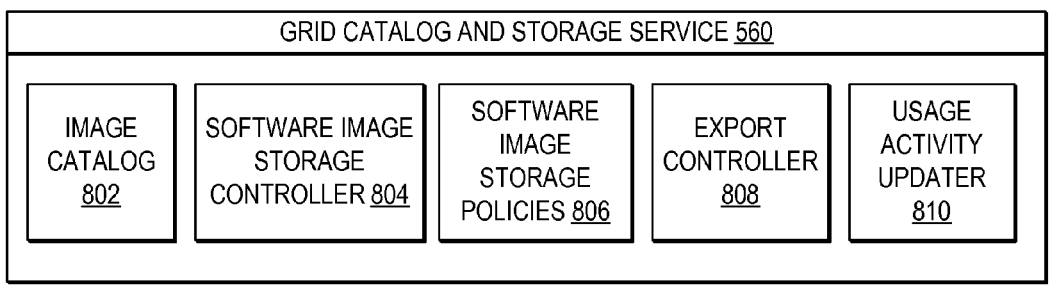
FIG. 8 is a block diagram depicting the components of a grid catalog and storage service in accordance with the present invention.

Referring now to FIG. 8, there is depicted a block diagram of the components of a grid catalog and storage service in accordance with the present invention. As depicted, grid catalog and storage service 560 includes a particular selection storage systems, services, and processes, however, it will be understood that other storage systems, services and processes may be implemented.

First, grid catalog and storage service 560 includes an image catalog 802. As will be further described with reference to FIGS. 9 and 10, image catalog 802 includes multiple software environment installation images stored in an efficiently searchable manner and for efficient access to quickly install and update software on grid hardware platforms.

In one example, the most frequently requested operating system and application software images may be initially manually loaded into image catalog 802. Next, a software image storage controller 804 provides automated dynamic control of the actual cataloging of software images from software environments for grid jobs in image catalog 802 based on software image storage policies 806 after the initial images are loaded.

With reference now to FIG. 9, a table 900 illustrates examples of image content, rationale for storage, and indexing references, that may be used by grid catalog and storage service 560. In the illustrative example, table 900 depicts the content of a software image in the column depicted at reference numeral 902, the image storage rationale in the column depicted at reference numeral 904, and an index reference in the column depicted at reference numeral 906.

Figure 10:
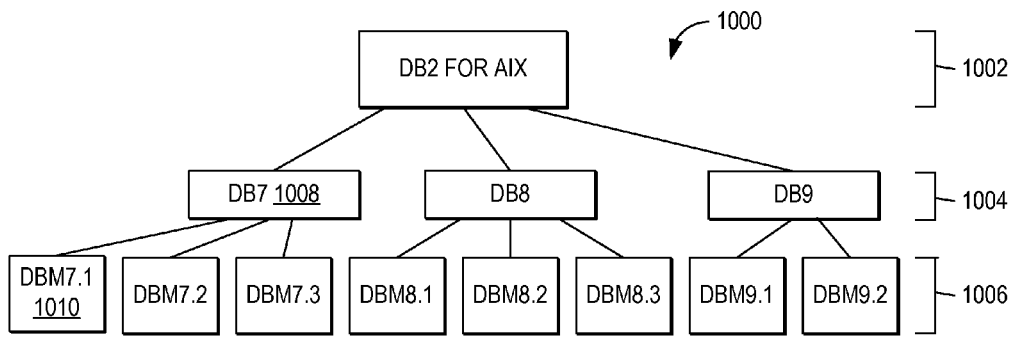
FIG. 10 is an illustrative examples of a hierarchical file system of software images that are cataloged, indexed, and stored in accordance with the method, system, and program of the present invention.

An entry 910 describes an image for the AIX operating system, version 5.3 with an index reference of "A5.3" and multiple rationale for storage including the ability to use the software image to build new software images as future maintenance levels (MLs) are released and the ability to use the image as a fresh starting point if an existing maintenance release is suspected of causing problems in an execution environment. In another example, an entry 912 describes an image for the maintenance level 1 (ML1) release for the AIX operating system, version 5.3 with an index reference of "AM5.3.1" and a rationale for storage including the ability to use the image to selectively apply maintenance patches or in whole to bring the operating system up to ML1. An entry 914 describes an image for the AIX operating system, version 5.3 updated to ML1 with an index reference of "A5.3.1" and a rationale for storage including the ability to use the software image to rapidly build the required operating system and maintenance level environment using a single installation process. Additional entries that will be further described with reference to FIG. 10 depict image descriptions for DB2 software, including entry 916 of DB2 version 9 indexed as "DB9", entry 918 of the DB2 version 9 second maintenance level indexed as "DBM9.2", and entry 920 of DB2 version 9 updated to ML2 indexed as "DB9.2". In addition, a software image may include a combination of an operating system and application software, such as entry 922 of the AIX operating system, version 5.3 with DB2 version 9 or entry 924 of the AIX operating system version 5.3 updated to ML1 with DB2 version 9 updated to ML2.

With reference to FIG. 10, images are cataloged, indexed, and stored in image catalog 802 for efficient storage, location, and access. In the example, for purposes of illustration, a hierarchical file system tree 1000 includes entries for each image stored in relations to DB2 software. Each entry described by a software index number, such as "DB7" that is linked to the storage location for the specific images.

The first level of hierarchical file system tree 1000, as depicted at reference numeral 1002 contains the high level directory entry identifying that the tree is for DB2 software for the AIX operating system. The first level of subdirectories are illustrated at reference numeral 1004, including images for DB2 versions 7, 8, and 9. Next, a second level of subdirectories are illustrated at reference numeral 1006, including images for maintenance level for each version of the DB2 product. For example, DB7, as depicted at reference numeral 1108, is linked via a software index number to the installation image for DB2 version 7, but DBM7.1, as depicted at reference numeral 1110, is linked via a software index number to the installation image for the maintenance level 2 update for DB2 version 7. It will be understood that additional levels of directories and subdirectories may be implemented within hierarchical file system tree 1000 and that additional hierarchical file system trees may be implemented for each general type of software accessed for a grid job software environment. Further, it will be understood that other types of data storage structures may be implemented within image catalog 802.

In one embodiment, the index numbers used to identify software images may be standardized for use across multiple grid systems. In this embodiment, a bid request for a grid job may specify the index numbers required for the grid job and the grid manager may determine whether the requested software is available or would be available if the grid job were submitted.

Returning now to FIG. 8, new software environments may be introduced into a grid environment in multiple ways. For example, a client may supply a software image to a software environment as part of a grid job, an existing operating system or operating system and application combination environment may be modified to meet a job specification for a particular grid job, or a software environment may be assembled from multiple stored software image that is a combination of operating system, application software, and maintenance software.

In one embodiment, either after the build is complete or after the completion of a grid job, software image storage controller 804 evaluates whether to store an image of the software environment in image database 502 for future build requests based on software image storage policies 806. In one example, software image storage controller 804 may determine whether the grid job will potentially be repeated based on other grid job bids and based on information collected by the grid accounting and statistics service 542. In another example, software image storage controller 804 may query job request and bid storage system 524 to determine whether there are outstanding bids on the same grid job as the recently completed grid job or whether the recently completed grid job is similar to grid jobs completed within a particular period of time. Further, software image storage controller 804 may determine to initially store all software environment images, which are then periodically archived if not reused within a particular period of time. In particular, image database 502 may be distributed across high performance media that holds more recently stored and used images and across a lower cost media that holds archived images.

When software image storage controller 804 decides to dynamically store a new software image, in one embodiment, a generic image would be created that is independent of any settings specific to a particular grid job. In one example, to generate the generic image, in an AIX environment, the process may include (1) setting the root password to null; (2) deleting all non-root users; (3) deleting custom configuration files; (4) unconfiguring and deleting all controllers, adapters, and devices; and (5) clear all error logs.

An export controller 808 controls exporting images to any resource node. In particular, export controller 808 insures that all available images are accessible to all available nodes. The actual export mechanism used by export controller 808 may vary based on the operating system being used. For example, for AIX and DB2, export controller 808 may implement the General Parallel File Systems (GPFS) as the file sharing mechanism. In one embodiment, using GPFS, the images in image catalog 802 are stored as a shared file system and each grid node would be configured as a client running GPFS peer software, which would allow any grid node to directly access all of the images contained within the shared file system. Alternatively, image catalog 802 may be implemented in a single or multiple Network Installation Management (NIM) servers. It is important to note that each export mechanism available within export controller 808 may be controlled by an automated script or workflow which enables export of the software images to resource nodes and controls the completion of installations and the performance of configurations.

A usage activity updater 810 controls updates to grid accounting and statistics service 542 when a software image is captured and added to image catalog 802 and when a software image is exported from image catalog 802. In particular, grid accounting and statistics server 542 maintains historical data of activity in grid environment 150 based on data collected from multiple subsystems and services within grid environment 150. Software image storage controller 804 may poll grid accounting and statistics service 542 to determine whether or not any of the stored images have remained idle for more than a particular period of time.

In particular, as previously described, software image storage controller 804 may remove or archive outdated or infrequently used images from image catalog 802. The actual process for removing images may depend upon the type of image, the location of the image, and whether the image directory and subdirectories need to be removed. In one example, if software image storage controller 804 determines that a particular version of DB2 is outdated, then the directory and subdirectories for that DB2 version are deleted. In another example, if NIM servers are implemented to install the DB2 version images, then software image storage controller 804 would remove all references to the DB2 version images from the NIM configuration. Further, in another example, if a DB2 version is not outdated, but is infrequently used, then software image storage controller 804 may control archiving the image for the DB2 version to a low-cost storage media, using operating system archiving commands or using a backup and recovery management system, such as Tivoli Storage Manager.

Figure 11:
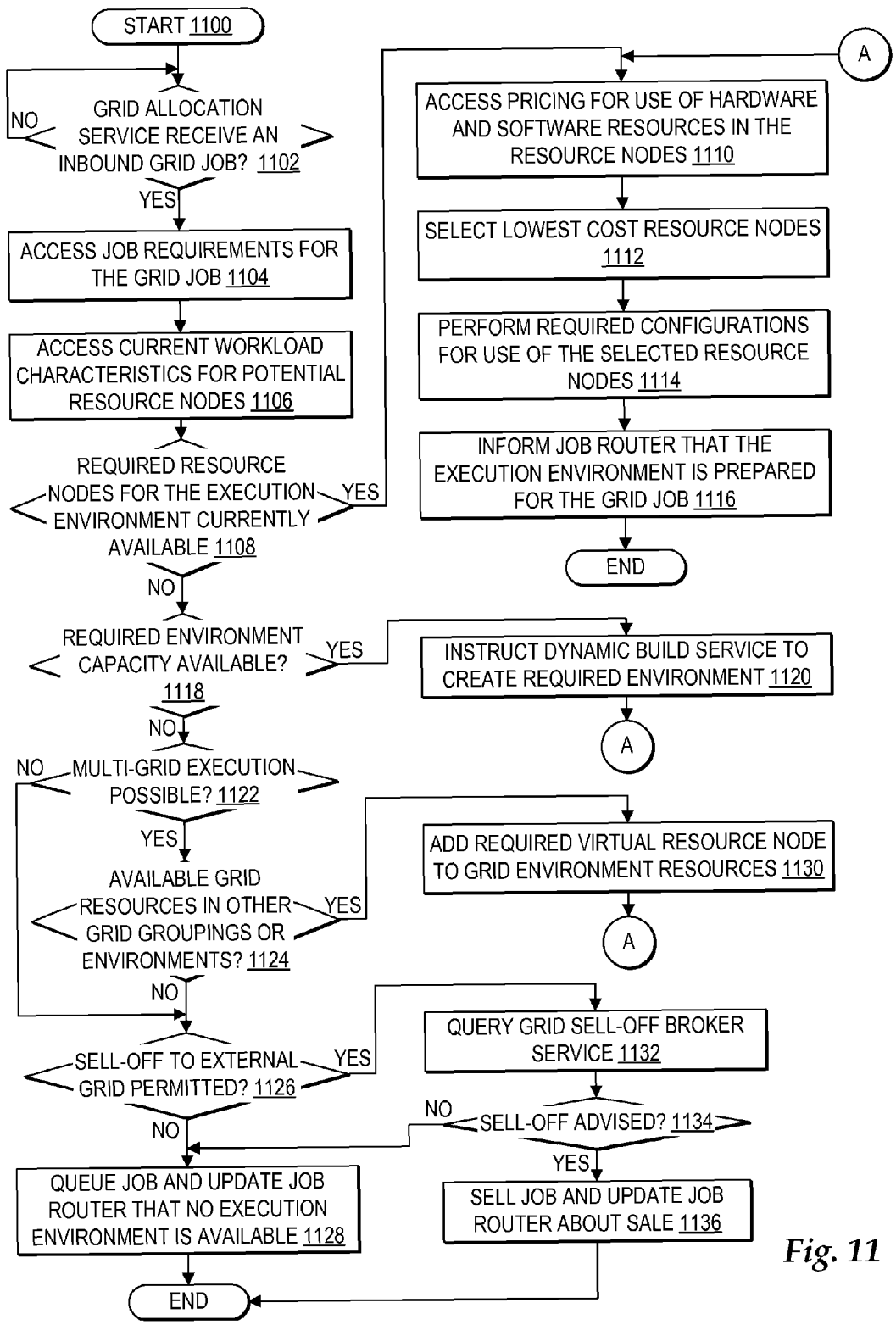
FIG. 11 is a high level logic flowchart of a process and program for controlling a grid allocation service in accordance with the method, system, and program of the present invention.

With reference now to FIG. 11, there is depicted a high level logic flowchart of a process and program for controlling a grid allocation service in accordance with the method, system, and program of the present invention. As illustrated, the process for controlling a grid allocation service starts at block 1100 and thereafter proceeds to block 1102. Block 1102 depicts a determination whether the grid allocation service receives an inbound grid job. When the grid allocation service receives an inbound grid job, the process passes to block 1104 depicts accessing the job requirements for the grid job, including the bid request, bid, service level agreement, and analysis of job requirements performed by other services within the grid management system. Next, block 1106 illustrates accessing the current workload characteristics for potential resource nodes. Thereafter, block 1108 depicts a determination whether the grid allocation service detects that the resource nodes required for the execution environment are available, meaning the resource nodes are available for allocation and already built to the job requirements.

At block 1108, if the required resource nodes are available then the process passes to block 1110. Block 1110 depicts accessing pricing for use of the hardware and software resources in the resource nodes. Next, block 1112 illustrates selecting the lowest cost resource nodes. Thereafter, block 1114 depicts performing the required configurations for the use of the selected resource nodes. Next, block 1116 illustrates informing the job router that the execution environment is prepared for the grid job, and the process ends.

Otherwise, at block 1118, if the required resource nodes are not available, then the process passes to block 1118. Block 1118 depicts a determination whether the required environment capacity is available within the grid environment. If the required environment capacity is available within the grid environment, then the process passes to block 1120. Block 1120 depicts instructing the dynamic build service to create the required environment from the available capacity of resources, and the process passes to block 1110. Otherwise, at block 1118, if the required environment capacity is not available, then the process passes to block.

Block 1122 depicts a determination whether multi-grid execution is possible. To determine whether multi-grid execution is possible, there must be access to use of resources from other grids and the job requirements for the grid job must allow multi-grid execution. If multi-grid execution is not possible, then the process passes to block 1126. If multi-grid execution is possible, then the process passes to block 1124. Block 1124 depicts a determination whether there are available grid resources in other grid groupings or environments. If there are not available grid resources in other grid groupings or environments, then the process passes to block 1126.

Block 1126 depicts a determination whether sell-off of the grid job to an external grid is permitted. If sell-off of the grid job to an external grid is not permitted, then the process passes to block 1128. Block 1128 depicts queuing the job and updating the job router to indicate that no execution environment is available for the grid job, and the process ends. Otherwise, at block 1126, if sell-off of the grid job to an external grid is permitted, then the process passes to block 1132. Block 1132 depicts querying the grid sell-off broker service with the job requirements. Next, block 1134 depicts a determination whether the grid sell-off broker service advises a sell-off. If the grid sell-off broker service does not advise a sell-off, then the process passes to block 1128, which was previously described. If the grid sell-off broker service does advise a sell-off, then the process passes to block 1136. Block 1136 depicts selling the job and updating the job router about the sale, and the process ends.

Returning to block 1124, if there are available grid resources in other grid groupings or environments, then the process passes to block 1130. Block 1130 depicts adding the required virtual resource nodes to the execution environment, and the process passes to block 1110. In addition, although not depicted, grid allocation service may call the grid dynamic build service to build the virtual resource nodes.

Figure 12:
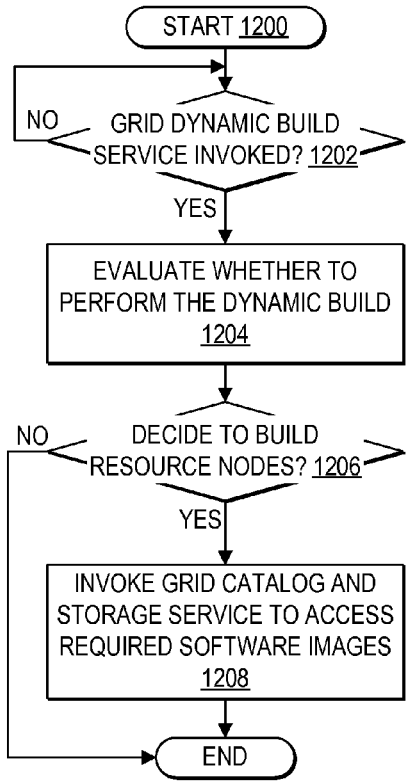
FIG. 12 is a high level logic flowchart of a process and program for controlling a grid dynamic build service in accordance with the method, system, and program of the present invention.

Referring now to FIG. 12, there is depicted a high level logic flowchart of a process and program for controlling a grid dynamic build service in accordance with the method, system, and program of the present invention. As illustrated, the process stars at block 1200 and thereafter proceeds to block 1202. Block 1202 depicts a determination of whether the grid dynamic build service is invoked. If the grid dynamic build service is invoked, then the process passes to block 1204. Block 1204 depicts the grid dynamic build service evaluating whether to perform the dynamic build. In particular, the grid dynamic build service may consult with the grid allocation service and other grid services to determine whether it is cost effective and performance effective to build the resource nodes. Next, block 1206 depicts a determination whether the grid dynamic build service decides to build the resource nodes. If the grid dynamic build service decides not to build the resource nodes, then the process ends and an error message may be returned to the grid allocation service. If the grid dynamic build service does decide to build the resource nodes, then the process passes to block 1208. Block 1208 depicts invoking the grid catalog and storage service to access the required software images to build the required resource nodes for the grid job, and the process ends.

Figure 13:
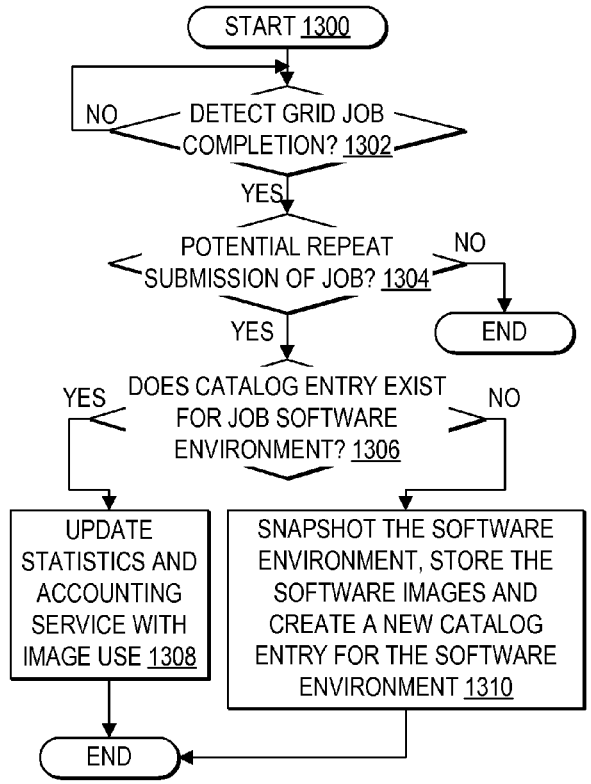
FIG. 13 is a high level logic flowchart of a process and program for controlling dynamic storage of software images in an efficient storage structure in accordance with the method, system, and program of the present invention.

With reference now to FIG. 13, there is depicted a high level logic flowchart of a process and program for controlling dynamic storage of software images in an efficient storage structure in accordance with the method, system, and program of the present invention. As illustrated, the process starts at block 1300 and thereafter proceeds to block 1302. Block 1302 depicts a determination whether a grid job completion is detected. When a grid job completes, then the software image storage controller of the grid catalog and storage service determines whether the job has potential to be repeated, as illustrated at block 1304. As previously described, the software image storage controller may access bid offers for future grid job submissions and statistics maintained about previous grid job submissions to determine if the current job is one that is likely to be repeated. If the job does not have potential to be a repeat job, then the process ends. If the job has potential to be a repeat submission, then the process passes to block 1306. Block 1306 depicts a determination whether a catalog entry exists in the image catalog for the grid job software environment. If a catalog entry already exists, then the process passes to block 1308. Block 1308 depicts updating the statistics and accounting service with the image use, and the process ends. Otherwise, at block 1306, if the catalog entry does not exist for the grid job software environment, then the process passes to block 1310. Block 1310 depicts taking a snapshot of the software environment, storing the resource node software images, and creating a new catalog entry for the software image, and the process ends. In one example, a software environment snapshot contains the currently used software modules (e.g. operating system, application software, databases, and middleware), current configurations, and job execution environments and conditions for the execution of a current grid job.

Figure 14:
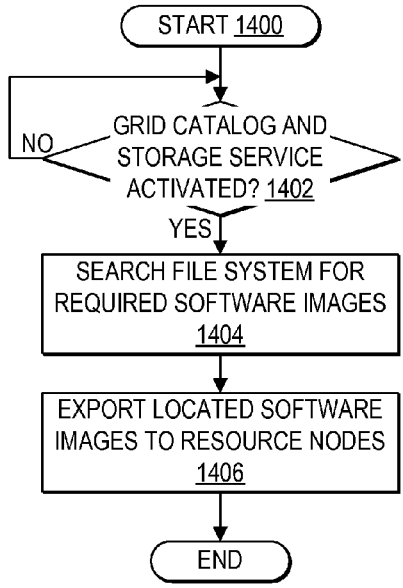
FIG. 14 is a high level logic flowchart of a process and program for exporting software images in accordance with the method, system, and program of the present invention.

Referring now to FIG. 14, there is depicted a high level logic flowchart of a process and program for exporting software images in accordance with the method, system, and program of the present invention. As depicted, the process starts at block 1400 and thereafter proceeds to block 1402. Block 1402 depicts a determination whether the grid catalog and storage service is activated. If the grid catalog and storage service is activated, then the process passes to block 1404. Block 1404 illustrates searching the file system for the required software image, where all software images are available for access by any resource node. Next, block 1406 depicts exporting the located software images to the resources nodes being built, and the process ends.

Figure 15:
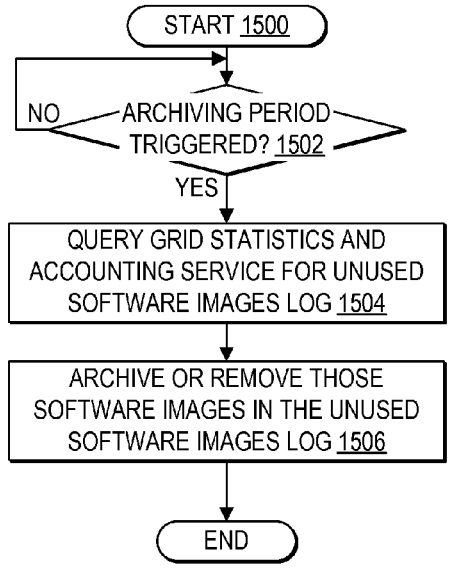
FIG. 15 is a high level logic flowchart depicting a process and program for archiving software images in accordance with the method, system, and program of the present invention.

With reference now to FIG. 15, there is depicted a high level logic flowchart of a process and program for archiving software images in accordance with the method, system, and program of the present invention. As illustrated, the process starts at block 1500 and thereafter proceeds to block 1502. Block 1502 depicts a determination whether an archiving period is triggered. Software image storage controller 804 may trigger archiving periods at particular intervals in time or an archiving period may be triggered if the higher speed storage medium used for storing the software images is full, for example. If an archiving period is triggered, then the process passes to block 1504. Block 1504 illustrates querying the grid statistics and accounting service for an unused software images log or other indication of software images that have not been used or have not been used recently. Next, block

1506 depicts archiving or removing those software images that indicated as not recently used, and the process ends.

While the invention has been particularly shown and described with reference to a preferred embodiment, it will be understood by those skilled in the art that various changes in form and detail may be made therein without departing from the spirit and scope of the invention.

What is claimed is:

1. A computer system for dynamically managing a plurality of software images in a grid environment, said computer system comprising:
   one or more processors;
   one or more computer-readable tangible storage devices;
   program instructions, stored on at least one of said one or more storage devices for execution by at least one of said one or more processors, for monitoring, in a first grid service, a grid environment, said grid environment comprising a plurality of computing systems each comprising at least one resource and communicatively connected over a network to share each said at least one resource through at least one grid service implemented within an open grid services architecture enabling interfacing with each said at least one resource through at least one web service, wherein said first grid service is from among said at least one grid service;
   program instructions, stored on at least one of said one or more storage devices for execution by at least one of said one or more processors, for detecting a current software environment for a current grid job within said grid environment, wherein said first grid service maintains a catalog of a plurality of software images for installation on hardware resources from among said at least one resource, each of said plurality of software images specified with a separate rationale from among a plurality of required rationales for maintaining each of said plurality of software images in storage;
   program instructions, stored on at least one of said one or more storage devices for execution by at least one of said one or more processors, for searching said catalog of said plurality of software images to determine whether an image for said current software environment matches one from among said plurality of software images, wherein each of said plurality of software images comprises at least one installation image for a particular software environment, wherein storage of each of said plurality of software images is structured in said catalog for automated efficient access by each of a plurality of resource nodes within said grid environment;
   program instructions, stored on at least one of said one or more storage devices for execution by at least one of said one or more processors, responsive to not locating said current software environment in said catalog, for automatically evaluating whether storage of said current software environment meets at least one of said plurality of required rationales; and
   program instructions, stored on at least one of said one or more storage devices for execution by at least one of said one or more processors, responsive to said first grid service determining storage of said current software environment meets at least one of said plurality of required rationales, for automatically capturing at least one installation image for said current software environment and storing said captured at least one installation image in said catalog as an additional software image to said plurality of software images.

2. The computer system according to claim 1, further comprising program instructions, stored on at least one of said one or more storage devices for execution by at least one of said one or more processors, for detecting said current software environment for said current grid job when processing of said current grid job within said grid environment is complete.

3. The computer system according to claim 1 wherein said at least one installation image comprises at least one from among an operating system base version installation image, an operating system version maintenance level installation image, an application software installation image, and an application software maintenance level installation image.

4. The computer system according to claim 1 further comprising program instructions, stored on at least one of said one or more storage devices for execution by at least one of said one or more processors, for creating a new searchable entry in the catalog for said additional software image.

5. The computer system according to claim 1 further comprising:
   program instructions, stored on at least one of said one or more storage devices for execution by at least one of said one or more processors, for indexing each of said plurality of software images by one index name from among a plurality of available index names;
   program instructions, stored on at least one of said one or more storage devices for execution by at least one of said one or more processors, for receiving a grid job requirement identifying a particular index name from among said plurality of available index names;
   program instructions, stored on at least one of said one or more storage devices for execution by at least one of said one or more processors, for searching said catalog to determine if a particular software image with said particular index name is currently stored in said catalog; and
   program instructions, stored on at least one of said one or more storage devices for execution by at least one of said one or more processors, responsive to identifying said particular software image, for exporting said particular software image for building at least one grid resource for said grid job requirement.

6. The computer system according to claim 1 further comprising:
   program instructions, stored on at least one of said one or more storage devices for execution by at least one of said one or more processors, responsive to receiving a request to install software meeting a job requirement for an incoming grid job, for searching said catalog for at least one required software image for installation of said software meeting said job requirement; and
   program instructions, stored on at least one of said one or more storage devices for execution by at least one of said one or more processors, responsive to locating said at least one required software image, for implementing at least one resource node built for said incoming grid job access to said at least one required software installation image.

7. The computer system according to claim 6 further comprising:
   program instructions, stored on at least one of said one or more storage devices for execution by at least one of said one or more processors, for detecting said incoming grid job for execution within said grid environment;
   program instructions, stored on at least one of said one or more storage devices for execution by at least one of said one or more processors, for determining said job requirement for said grid job, wherein said job requirement specifies at least one type of hardware platform and at least one type of software platform for said grid job;

program instructions, stored on at least one of said one or more storage devices for execution by at least one of said one or more processors, for accessing a current workload and current pricing for use of a selection of resource nodes from among said plurality of resources that match said at least one type of hardware platform and said at least one type of software platform required for said grid job; and program instructions, stored on at least one of said one or more storage devices for execution by at least one of said one or more processors, for selecting a particular hardware resource node from among said selection of resource nodes based on a cost of said particular hardware resource node;

program instructions, stored on at least one of said one or more storage devices for execution by at least one of said one or more processors, for selecting a particular type of software platform from among said at least one type of software platform based on a cost of said particular type of software platform; and program instructions, stored on at least one of said one or more storage devices for execution by at least one of said one or more processors, for initiating a request to install said particular type of software platform on said particular hardware resource node to meet said job requirement for said incoming grid job.

8. The computer system according to claim 1 further comprising:

program instructions, stored on at least one of said one or more storage devices for execution by at least one of said one or more processors, for determining whether said current grid job is likely to be repeated before capturing said at least one installation image for said current software environment by performing at least one from among searching a plurality of future bid offers for said grid environment for jobs matching said current grid job and accessing a history of software environments matching said current software environment.

9. The computer-implemented system according to claim 1 further comprising:

program instructions, stored on at least one of said one or more storage devices for execution by at least one of said one or more processors, responsive to detecting an archive period trigger, for determining a selection of software images from among said plurality of software images that have remained unused over a particular period of time; and program instructions, stored on at least one of said one or more storage devices for execution by at least one of said one or more processors, for archiving said selection of software images in an alternate data storage medium.

10. The computer system according to claim 1 further comprising program instructions, stored on at least one of said one or more storage devices for execution by at least one of said one or more processors, for automatically evaluating whether said current software environment meets at least one of said plurality of required rationales by comprising a base image from which new images are built as future maintenance levels to said base image are released.

11. The computer system according to claim 1 further comprising program instructions, stored on at least one of said one or more storage devices for execution by at least one of said one or more processors, for automatically evaluating whether said current software environment meets at least one of said plurality of required rationales by comprising a base image designated as a starting point if an existing maintenance release is suspected of causing problems in an execution environment.

12. The computer system according to claim 1 further comprising program instructions, stored on at least one of said one or more storage devices for execution by at least one of said one or more processors, for automatically evaluating whether said current software environment meets at least one of said plurality of required rationales by comprising a maintenance level image designated to selectively apply for a patch for an operating system.

13. The computer system according to claim 1 further comprising program instructions, stored on at least one of said one or more storage devices for execution by at least one of said one or more processors, for automatically evaluating whether said current software environment meets at least one of said plurality of required rationales by comprising a base image and a maintenance level image designated for building a required operating system using a single installation process.

14. A computer program product for dynamically managing a plurality of software images in a grid environment, the computer program product comprising:

one or more computer-readable tangible storage devices;

program instructions, stored on at least one of the one or more storage devices, to monitor, in a first grid service, a grid environment, said grid environment comprising a plurality of computing systems each comprising at least one resource and communicatively connected over a network to share each said at least one resource through at least one grid service implemented within an open grid services architecture enabling interfacing with each said at least one resource through at least one web service, wherein said first grid service is from among said at least one grid service, program instructions, stored on at least one of the one or more storage devices, to detect a current software environment for a current grid job within said grid environment, wherein said first grid service maintains a catalog of a plurality of software images for installation on hardware resources from among said at least one resource, each of said plurality of software images specified with a separate rationale from among a plurality of required rationales for maintaining each of said plurality of software images in storage;

program instructions, stored on at least one of the one or more storage devices, to search said catalog of said plurality of software images to determine whether an image for said current software environment matches one from among said plurality of software images, wherein each of said plurality of software images comprises at least one installation image for a particular software environment, wherein storage of each of said plurality of software images is structured in said catalog for automated efficient access by each of a plurality of resource nodes within said grid environment;

program instructions, stored on at least one of the one or more storage devices, responsive to not locating said current software environment in said catalog, to automatically evaluate whether storage of said current software environment meets at least one of said plurality of required rationales; and program instructions, stored on at least one of the one or more storage devices, responsive to said first grid service determining storage of said current software environment meets at least one of said plurality of required rationales, to automatically capture at least one installation image for said current software environment and storing said captured at least one installation image in said catalog as an additional software image to said plurality of software images.

15. The computer program product according to claim 14 wherein said at least one installation image comprises at least one from among an operating system base version installation image, an operating system version maintenance level installation image, an application software installation image, and an application software maintenance level installation image.

16. The computer program product according to claim 14, said computer program product further comprising:
program instructions, stored on at least one of the one or more storage devices, to index each of said plurality of software images by one index name from among a plurality of available index names;
program instructions, stored on at least one of the one or more storage devices, to receive a grid job requirement identifying a particular index name from among said plurality of available index names;
program instructions, stored on at least one of the one or more storage devices, to search said catalog to determine if a particular software image with said particular index name is currently stored in said catalog; and
program instructions, stored on at least one of the one or more storage devices, responsive to identifying said particular software image, to export said particular software image for building at least one grid resource for said grid job requirement.

17. The computer program product according to claim 14, said computer program product further comprising:
program instructions, stored on at least one of the one or more storage devices, responsive to receiving a request to install software meeting a job requirement for an incoming grid job, to search said catalog for at least one required software image for installation of said software meeting said job requirement; and
program instructions, stored on at least one of the one or more storage devices, responsive to locating said at least one required software image, to implement at least one resource node built for said incoming grid job access to said at least one required software installation image.

18. The computer program product according to claim 17, said computer program product further comprising:
program instructions, stored on at least one of the one or more storage devices, to detect said incoming grid job for execution within said grid environment;
program instructions, stored on at least one of the one or more storage devices, to determine said job requirement for said grid job, wherein said job requirement specifies at least one type of hardware platform and at least one type of software platform for said grid job;
program instructions, stored on at least one of the one or more storage devices, to access a current workload and current pricing for use of a selection of resource nodes from among said plurality of resources that match said at least one type of hardware platform and said at least one type of software platform required for said grid job; and
program instructions, stored on at least one of the one or more storage devices, to select a particular hardware resource node from among said selection of resource nodes based on a cost of said particular hardware resource node;
program instructions, stored on at least one of the one or more storage devices, to select a particular type of software platform from among said at least one type of software platform based on a cost of said particular type of software platform; and
program instructions, stored on at least one of the one or more storage devices, to initiate a request to install said particular type of software platform on said particular hardware resource node to meet said job requirement for said incoming grid job.

19. The computer program product according to claim 14, said computer program product further comprising:
program instructions, stored on at least one of the one or more storage devices, to determine whether said current grid job is likely to be repeated before capturing said at least one installation image for said current software environment by performing at least one from among searching a plurality of future bid offers for said grid environment for jobs matching said current grid job and accessing a history of software environments matching said current software environment.

20. The computer program product according to claim 14, said computer program product further comprising:
program instructions, stored on at least one of the one or more storage devices, responsive to detecting an archive period trigger, to determine a selection of software images from among said plurality of software images that have remained unused over a particular period of time; and
program instructions, stored on at least one of the one or more storage devices, to archive said selection of software images in an alternate data storage medium.

* * * * *